US012759277B2

(12) United States Patent
Chowdhury et al.

(10) Patent No.: US 12,759,277 B2
(45) **Date of Patent: *Oct. 13, 2026**

(54) HYDROPHOBIC SILICA WET GEL AND AEROGEL

(71) Applicant: Cardinal CG Company, Eden Prairie, MN (US)

(72) Inventors: Reaz Ahmed Chowdhury, Middleton, WI (US); Kari B. Myli, Sauk City, WI (US)

(73) Assignee: Cardinal CG Company, Eden Prairie, MN (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/637,818

(22) Filed: Apr. 17, 2024

(65) Prior Publication Data

US 2025/0326219 A1 Oct. 23, 2025

(51) Int. Cl.

| | |
|---|---|
| ***B32B 38/00*** | (2006.01) |
| ***B32B 5/18*** | (2006.01) |
| ***B32B 17/06*** | (2006.01) |

(52) U.S. Cl.

CPC ............ *B32B 38/0032* (2013.01); *B32B 5/18* (2013.01); *B32B 17/066* (2013.01);

(Continued)

(58) Field of Classification Search

CPC ............ B32B 17/066; B32B 17/10036; B32B 17/10165; B32B 17/10302; B32B 17/10761; B32B 2038/0084; B32B 2250/02; B32B 2266/057; B32B 2266/06; B32B 2266/102; B32B 2266/126; B32B 2305/022; B32B 2307/304; B32B 2307/412; B32B 2307/72; B32B 2307/73; B32B 2307/7376; B32B 2309/04; B32B 2315/08; B32B 27/065; B32B 27/30; B32B 3/02; B32B 38/0032; B32B 38/164; B32B 5/18; C01B 33/158; C01B 33/159;

(Continued)

(56) References Cited

U.S. PATENT DOCUMENTS

| | | | |
|---|---|---|---|
| 3,672,833 | A | 6/1972 | Teichner et al. |
| 4,327,065 | A | 4/1982 | Von Dardel et al. |

(Continued)

FOREIGN PATENT DOCUMENTS

| | | | |
|---|---|---|---|
| AU | 688208 | B2 | 3/1998 |
| CN | 102180603 | A | 9/2011 |

(Continued)

OTHER PUBLICATIONS

Machine Translation for JP-2003212535 (Year: 2003).*

(Continued)

*Primary Examiner* — Michael Forrest

(74) *Attorney, Agent, or Firm* — Fredrikson & Byron, P.A.

(57) ABSTRACT

The invention provides hydrophobic silica wet gel, hydrophobic silica aerogel, and methods that can be used to form an enhanced hydrophobic silica aerogel sheet having an advantageous combination of properties. Some embodiments of the invention provide a hydrophobic silica aerogel having advantageous properties, such as desirable performance on visible transmission, haze, or both.

25 Claims, 5 Drawing Sheets

(52) U.S. Cl.
CPC .... *B32B 38/164* (2013.01); *B32B 2038/0084* (2013.01); *B32B 2250/02* (2013.01); *B32B 2266/057* (2016.11); *B32B 2266/126* (2016.11); *B32B 2305/022* (2013.01); *B32B 2307/412* (2013.01); *B32B 2307/72* (2013.01); *B32B 2307/73* (2013.01); *B32B 2307/7376* (2023.05); *B32B 2309/04* (2013.01); *B32B 2315/08* (2013.01)

(58) Field of Classification Search
CPC ............. E06B 3/66314; E06B 3/66319; E06B 3/6715; E06B 3/6722
See application file for complete search history.

(56) References Cited

U.S. PATENT DOCUMENTS 4,402,927 A 9/1983 Von Dardel et al.
4,610,863 A 9/1986 Tewari et al.
4,667,417 A 5/1987 Graser et al.
5,294,480 A 3/1994 Mielke et al.
5,395,805 A 3/1995 Droege et al.
5,409,683 A 4/1995 Tillotson et al.
5,496,527 A 3/1996 Yokogawa et al.
5,587,107 A 12/1996 Schwertfeger et al.
5,795,557 A 8/1998 Pajonk et al.
5,830,387 A 11/1998 Yokogawa et al.
5,958,363 A 9/1999 Coronado
6,197,270 B1 3/2001 Sonoda et al.
6,627,305 B1 9/2003 Deane et al.
6,656,527 B1 12/2003 Gessner et al.
6,740,416 B1 5/2004 Yokogawa et al.
7,074,880 B2 7/2006 Rhine et al.
7,384,988 B2 6/2008 Gauthier et al.
7,560,062 B2 7/2009 Gould et al.
7,771,609 B2 8/2010 Leventis et al.
8,029,871 B2 10/2011 Nakayama et al.
8,142,856 B2 3/2012 Chevalier
8,202,502 B2 6/2012 Floess et al.
8,258,251 B2 9/2012 Meador et al.
8,298,622 B2 10/2012 Nakayama et al.
8,889,749 B2 11/2014 Suh et al.
8,906,973 B2 12/2014 Rhine et al.
9,068,346 B1 6/2015 Lu et al.
9,764,301 B2 9/2017 Joshi et al.
9,834,446 B2 12/2017 Kim et al.
9,862,614 B2 1/2018 Oh et al.
10,294,111 B2 5/2019 Kim et al.
10,336,621 B2 7/2019 Kim et al.
10,401,876 B1 9/2019 Coleman
10,421,253 B2 9/2019 Van Overmeere et al.
10,563,035 B2 2/2020 Steiner, III et al.
10,717,824 B2 7/2020 Chintapalli et al.
10,800,883 B1 10/2020 Vivod et al.
10,875,776 B2 12/2020 Sakatani et al.
10,889,501 B2 1/2021 Huang et al.
11,053,127 B2 7/2021 Pashaei Soorbaghi
11,170,750 B2 11/2021 Wang et al.
11,220,434 B2 1/2022 Kim et al.
2002/0102674 A1 8/2002 Anderson
2005/0100728 A1 5/2005 Ristic-Lehmann et al.
2006/0246806 A1 11/2006 Rhine et al.
2006/0247349 A1 11/2006 Kollmann et al.
2006/0286360 A1 12/2006 Rhine et al.
2007/0148435 A1 6/2007 Meredith et al.
2008/0081014 A1 4/2008 Ahn et al.
2008/0258065 A1 10/2008 Banks
2010/0080949 A1 4/2010 Ou et al.
2010/0144962 A1 6/2010 Jana et al.
2011/0223329 A1 9/2011 Meredith et al.
2012/0128958 A1 5/2012 Zeng et al.
2013/0136664 A1 5/2013 Bono et al.
2013/0170218 A1 7/2013 Mazurek et al.
2013/0202890 A1 8/2013 Kong et al.
2014/0065329 A1 3/2014 Showers
2014/0323589 A1 10/2014 Debreceni
2014/0350134 A1 11/2014 Rodman et al.
2015/0004087 A1 1/2015 Zettl et al.
2016/0096949 A1* 4/2016 Evans ................ C01B 33/1585 521/122
2016/0160557 A1 6/2016 Kim et al.
2016/0266288 A1 9/2016 Ozcan
2017/0369326 A1* 12/2017 Kim ...................... C09C 1/3018
2018/0093456 A1 4/2018 Van Overmeere et al.
2018/0112054 A1 4/2018 Steiner, III et al.
2018/0264784 A1 9/2018 Murofushi et al.
2018/0264793 A1 9/2018 Kim et al.
2019/0143290 A1 5/2019 Bertino et al.
2019/0333490 A1 10/2019 Wang et al.
2020/0181347 A1 6/2020 Asefa et al.
2020/0231452 A1 7/2020 Takayasu et al.
2020/0255295 A1 8/2020 Kim et al.
2020/0353437 A1 11/2020 Bertino et al.
2020/0407231 A1 12/2020 Choi et al.
2021/0039954 A1 2/2021 Numrich et al.
2021/0207428 A1 7/2021 Pilon et al.
2021/0269317 A1 9/2021 Hsieh et al.
2022/0042370 A1 2/2022 Burrows
2022/0315431 A1 10/2022 Zenitani et al.
2023/0286810 A1 9/2023 Chowdhury et al.
2023/0286812 A1 9/2023 Chowdhury et al.
2023/0286813 A1 9/2023 Chowdhury et al.
2023/0416099 A1 12/2023 Chowdhury et al.
2024/0199835 A1 6/2024 Chen et al.
2024/0351313 A1 10/2024 Chowdhury et al.
2024/0351314 A1 10/2024 Chowdhury et al.
2024/0351326 A1 10/2024 Chowdhury et al.
2024/0351890 A1 10/2024 Chowdhury et al.
2024/0351891 A1 10/2024 Chowdhury et al.
2024/0359451 A1 10/2024 Chowdhury et al.
2024/0367429 A1 11/2024 Chowdhury et al.
2024/0367983 A1 11/2024 Chowdhury et al.
2025/0326203 A1 10/2025 Chowdhury et al.
2025/0326219 A1 10/2025 Chowdhury et al.
2025/0326220 A1 10/2025 Chowdhury et al.
2025/0326221 A1 10/2025 Chowdhury et al.
2025/0326647 A1 10/2025 Chowdhury et al.
2025/0326648 A1 10/2025 Chowdhury et al.
2025/0326649 A1 10/2025 Chowdhury et al.
2025/0326650 A1 10/2025 Chowdhury et al.

FOREIGN PATENT DOCUMENTS

CN 202706291 U 1/2013
CN 104898295 A 9/2015
CN 105201355 A 12/2015
CN 204936377 U 1/2016
CN 105441036 A 3/2016
CN 205117117 U 3/2016
CN 205117118 U 3/2016
CN 106082697 A 11/2016
CN 205736249 U 11/2016
CN 206589417 U 10/2017
CN 107381581 A 11/2017
CN 206983435 U 2/2018
CN 207190441 U 4/2018
CN 108060874 A 5/2018
CN 110902690 A 3/2020
CN 111101819 A 5/2020
CN 112174144 A 1/2021
CN 112299428 A 2/2021
CN 112499635 A 3/2021
CN 114477195 A 5/2022
CN 114538453 A 5/2022
CN 115057447 A 9/2022
DE 3917629 A1 12/1989
DE 102006050117 A1 4/2008
EP 193717 A2 9/1986
EP 653377 A1 5/1995
EP 849220 A1 6/1998
EP 1153739 A1 11/2001
EP 1414266 A2 4/2004
EP 3112773 A1 1/2017
EP 3671291 A1 6/2020

(56) References Cited

FOREIGN PATENT DOCUMENTS

| | | | |
|---|---|---|---|
| GB | 2241468 | A | 9/1991 |
| JP | H06135712 | A | 5/1994 |
| JP | 11172000 | A | 6/1999 |
| JP | 2003212535 | A * | 7/2003 |
| JP | 2004256628 | A | 9/2004 |
| JP | 2005132641 | A | 5/2005 |
| KR | 1020100055248 | A | 5/2010 |
| KR | 101790390 | B1 | 10/2017 |
| WO | 9203378 | A1 | 3/1992 |
| WO | 2008144634 | A2 | 11/2008 |
| WO | 2010080059 | A1 | 7/2010 |
| WO | 2010080060 | A1 | 7/2010 |
| WO | 2014019809 | A1 | 2/2014 |
| WO | 2014126490 | A1 | 8/2014 |
| WO | 2015061075 | A1 | 4/2015 |
| WO | 2015128364 | A1 | 9/2015 |
| WO | 2017090686 | A1 | 6/2017 |
| WO | 2017147463 | A1 | 8/2017 |
| WO | 2017185009 | A1 | 10/2017 |
| WO | 2017222733 | A2 | 12/2017 |
| WO | 2019241604 | A1 | 12/2019 |
| WO | 2020005965 | A1 | 1/2020 |
| WO | 2020220138 | A1 | 11/2020 |
| WO | 2024220696 | A2 | 10/2024 |
| WO | 2024220699 | A1 | 10/2024 |
| WO | 2024220701 | A1 | 10/2024 |

OTHER PUBLICATIONS

Tabata et al (Hydrophobic silica aerogel production at KEK, Nucl. Instruments Methods Phys. Res. Sect. A Accel. Spectrometers, Detect. Assoc. Equip., 668 (2012) (Year: 2012).*

Dieudonne et al "Transformation of nanostructure of silica gels during drying", Journal of Non-Crystalline Solids, vol. 262, Feb. 1, 2000, pp. 155-161.

Duraes et al., "Effect of the Drying Conditions on the Microstructure of Silica Based Xerogels and Aerogels," Journal of Nanoscience and Nanotechnolgy, vol. 12, 2012, pp. 6828-6834.

Haimer et al., "Silica modified cellulosic aerogels," Cellulose, Feb. 2010, 8 pages.

Hasan et al., "Structural, out-gassing and nanomechanical properties of super-hydrophobic transparent silica aerogels developed by ambient pressure drying for space application," Bull Mater Sci (2020) 43: 287.

Krieble et al., "The Hydrolytic Cleavage of Methyl and Chloromethyl Siloxanes," The Research Laboratory, General Electric Company, Nov. 1946, pp. 2291-2294.

Mahadik et al., "Monolithic and shrinkage-free hydrophobic silica aerogels via new rapid supercritical extraction process," The Journal of Supercritical Fluids (2016), Sep. 2, 2015, pp. 84-91.

Mahadik et al., "Recoverable and thermally stable superhydrophobic silica coating," J Sol-Gel Sci Technol (2012) 62, pp. 490-494.

Nadargi et al., "Methyltriethoxysilane: New precursor for synthesizing silica aerogels," Journal of Alloys and Compounds 467 (2009), pp. 397-404.

Omranpour et al., "Mechanical properties improvement of silica aerogel through aging: Role of solvent type, time and temperature," AIP Conference Proceedings 1593 (2014), May 15, 2014, pp. 298-302.

Parale et al., "Flexible and Transparent Silica Aeroegels: An Overview" Journal of the Korean Ceramic Society vol. 54, No. 3, Published May 22, 2017, pp. 184-199.

Parale et al., "Hydrophobic TiO2—SiO2 composite aerogels synthesized via in situ epoxy-ring opening polymerization and sol-gel process for enhanced degradation activity," Ceramics International (2020), 46(4), pp. 4939-4946.

Parale et al., "Sol-gel preparation of PTMS modified hydrophobic and transparent silica coatings," J Porous Matter (2013) 20, Nov. 2, 2012, pp. 733-739.

Pisal et al., "Development of hydrophobic and optically transparent monolithic silica aerogels for window panel applications," Crossmark J Porous Mater (2017) 24, Oct. 26, 2016, pp. 685-695.

Rao et al, "Effect of methyltrimethoxysilane as a co-precursor on the optical properties of silica aerogels," Journal of Non-Crystalline Solids (2001), 285, Issues 1-3, pp. 202-209.

Rao et al, "Hydrophobic and physical properties of the ambient pressure dried silica aerogels with sodium silicate precursor using various surface modification agents," Applied Surface Science 253 (2007) pp. 6032-6040.

Rao et al., "Superhydrophobic silica aerogels based on methyltrimethoxysilane precursor", Journal of Non-Crystalline Solids 330, 2003, pp. 187-195.

Ren et al., "One-step fabrication of transparent hydrophobic silica aerogels via in situ surface modification in drying process," J Sol-Gel Sci Technol (2016) 80, pp. 635-641.

Scherer et al., "Effect of Shrinkage on the Modulus of Silica Gel," Nov. 17, 1988, Journal of Non-Crystalline Solids 109 (1989), pp. 183-190.

Shafi et al., "Superhydrophobic, enhanced strength and thermal insulation silica aerogel/glass fiber felt based on methyltrimethoxysilane precursor and silica gel impregnation." Journal of Porous Materials, 2019, 8 pages.

Silva et al., "Acid and Base Catalysts in the Hybrid Silica Sol-Gel Process," Journal of Colloid and Interface Science 195, May 12, 1997, pp. 381-387.

Smitha et al., "Synthesis of biocompatible hydrophobic silica-gelatin nano-hybrid by sol-gel process," Colloids and Surfaces B: Biointerfaces 55, Nov. 17, 2006, pp. 38-43.

Smitha et al., "Transparent and Hydrophobic MTMS/GPTMS Hybrid Aerogel Monoliths and Coatings by Sol-Gel Method: A Viable Remedy for Oil-Spill Cleanup," ChemistrySelect (2018), 3, pp. 2989-2997.

Strobach et al., "Optically Transparent, Thermally Insulating and Soundproofing (OTTIS) Aerogel for High-efficiency Window Applications," Massachusetts Institute of Technology, Department of Mechanical Engineering (2020)—120 pages.

Su et al., "A review on the emerging resilient and multifunctional ceramic aerogels," Journal of Materials Science & Technology 75 (2021), Oct. 19, 2020, pp. 1-13.

Tabata "Transparent tiles of Silica Aerogels for High-Energy Physics" Feb. 14, 2019, pp. 31.

Tabata et al "Hydrophobic silica aerogel production at KEK", Nuclear Instruments & Methods in Physics Research, A, vol. 668, Dec. 5, 2011, pp. 64-70.

Tabata et al., "Large-area silica aerogel for use as Cherenkov radiators with high refractive index, developed by supercritical carbon dioxide drying," The Journal of Supercritical Fluids (2016) 110, pp. 183-192.

Wei et al., "Transparent, hydrophobic composite aerogels with high mechanical strength and low high-temperature thermal conductivities," J. Phys. Chem. B (2008) 112, pp. 11881-11886.

Wong et al., "Mechanical and thermal properties of nanofibrillated cellulose reinforced silica aerogel composites," Microporous and Mesoporous Materials 217, 2015, pp. 150-158.

Yoda et al., "Supercritical drying media modification for silica aerogel preparation," Journal of Non-Crystalline Solids 248 (1999), Aug. 25, 1998, pp. 224-234.

Cao et al., "Improving the visible transparency of silica aerogels", Journal of Non-Crystalline Solids, North-Holland Physics Publishing, vol. 176, No. 1, Oct. 2, 1994, pp. 18-25.

Rao et al., "Effect of methyltrimethoxysilane as a synthesis component on the hydrophobicity and some physical properties of silica aerogels", Microporous and Mesoporous Materials, 30, 1999, pp. 267-273.

Pierre et al., "Chemistry of Aerogels and Their Applications", Chemistry Reviews, vol. 102, No. 11, 2002, pp. 4243-4265.

Berardi et al., "The development of a monolithic aerogel glazed window for an energy retrofitting project", Applied Energy, 154, 2015, pp. 603-615.

Buratti et al., "Experimental performance evaluation of aerogel glazing systems", Applied Energy, 97, 2012, pp. 430-437.

(56) References Cited

OTHER PUBLICATIONS

Buratti et al., “Glazing Systems with Silica Aerogel for energy Savings in Buildings”, Applied Energy, 98, Apr. 27, 2012, pp. 396-403.
Buttner et al., “Thermal Loss Coefficients of Low-Density Silica Aerogel Tiles”, Solar Energy, vol. 40, No. 1, 1988, pp. 13-15.
Duer et al., “Monolithic Silica Aerogel in Superinsulating Glazings”, Solar Energy, vol. 63, No. 4, 1998, pp. 259-267.
Gao et al., “Synthesis and Characterization of Aerogel Glass Materials for Window Glazing Applications”, Advances in Bioceramics and Porous Ceramics VII, 2015, pp. 141-150.
Iswar et al., “Dense and strong, but superinsulating silica aerogel”, Acta Materialia, 213, 116959, May 9, 2021, pp. 9.
Lei et al., “Tailoring structural and physical properties of polymethylsilsesquioxane aerogels by adjusting NH3 * H20 concentration”, Microporous and Mesoporous Materials, 258, 2018, pp. 236-243.
Merli et al., “Acoustic measurements on monolithic aerogel samples and application of the selected solutions to standard window systems”, Applied Acoustics, 142, 2018, pp. 123-131.
Pajonk et al., “Optical Transmission Properties of Silica Aerogels Prepared from Polyethoxidisiloxanes”, Journal of Non-Crystalline Solids, 210, 1997, pp. 224-231.
Pajonk, “Transparent Silica Aerogels”, Journal of Non-Crystalline Solids, 225, 1998, pp. 307-314.
Rao et al., “Influence of Molar Ratios of Precursor, Catalyst, Solvent and Water on Monolithicity and Physical Properties of TMOS Silica Aerogels”, Journal of Sol-Gel Science and Technology, 3, 1994, pp. 205-217.
Rubin et al., “Transparent Silica Aerogels for Window Insulation”, Solar Energy Materials, 7, 1983, pp. 393-400.
Schultz et al., “Evacuated Aerogel Glazings”, Vacuum, 82, 2008, pp. 723-729.
Sisib Silicones, “Methyl Silicate 51”, retrieved from <URL: http://www.powerchemical.net/silanes/5411.html>, retrieved Apr. 28, 2026, Published 2014, pp. 2.
Tajiri et al., “Effects of Supercritical Drying Media on Structure and Properties of Silica Aerogel”, Journal of Non-Crystalline Solids, 186, 1995, pp. 83-87.
Yokogawa et al., “Hydrophobic silica aerogels”, Journal of Non-Crystaline Solids, 186, 1995, pp. 23-19.
Zhao et al., “Theoretical and experimental investigation of haze in transparent aerogels”, Optics Express, 27(4), Feb. 18, 2019, pp. A39-A50.
Sinko, “Influence of Chemical Conditions on the Nanoporous Structure of Silicate Aerogels”. Materials 2010, 3, Published Jan. 26, 2010, pp. 704-740.
Ingale et al., “Physico-chemical properties of silica aerogels prepared from TMOS/MTMS mixtures”, Journal Porous Mater 2011, 18:567-572, Published Sep. 4, 2010, pp. 6.

* cited by examiner

HYDROPHOBIC SILICA WET GEL AND AEROGEL

FIELD OF THE INVENTION

The present invention relates to hydrophobic silica wet gel and methods of making hydrophobic silica wet gel. The invention also relates to hydrophobic transparent silica aerogel and methods of making hydrophobic transparent silica aerogel. Additionally, the invention relates to hydrophobic transparent silica aerogel sheets and methods of making hydrophobic transparent silica aerogel sheets. Further, the invention relates to an article having a glass sheet and a hydrophobic transparent silica aerogel sheet, and methods of making such an article. Still further, the invention relates to an insulating glazing unit having a hydrophobic transparent silica aerogel sheet between two glass sheets, and methods of making such an insulating glazing unit. Further yet, the invention relates to a laminated glass assembly having a hydrophobic transparent silica aerogel sheet between glass sheets, and methods of making such a laminated glass assembly.

BACKGROUND OF THE INVENTION

Silica aerogels are thermally insulating materials that have applications in a number of different industries. However, silica aerogels have had limited applications in windows because they have not traditionally achieved the right combination of mechanical, thermal and optical properties to be fully acceptable for all such applications. Researchers have experimented with many different precursor recipes and methods in the hope of producing silica aerogel with an optimum combination of mechanical, thermal and optical properties but have been unsuccessful. While some recipes and methods led to certain properties being optimized, other properties were compromised.

One property desirable for window applications is high visible transmission. When silica aerogel is provided as part of certain windows, it must be transparent to be considered optically acceptable. Another desirable property is low haze. Silica aerogel must have low haze to be ideal for use with many windows. Still another desirable property is moisture resistance. Silica aerogels tend to be hydrophilic and thus prone to deterioration of several different properties when exposed to enough moisture. Too much moisture exposure can cause undesirable optical defects, such as reduction in visible transmission and increase in haze. Since some amount of moisture is often present inside insulating glazing units, it is desirable for silica aerogel to be hydrophobic. Hydrophobic silica aerogel can resist deterioration from moisture, making it particularly advantageous for use in window applications.

Researchers have attempted to produce transparent hydrophobic silica aerogel. However, while researchers have found certain recipes and methods that produce hydrophobic silica aerogel, the resulting aerogel was characterized by lower visible transmission, too much haze, or both. Moreover, existing methods for making silica aerogel hydrophobic have not been ideal for commercial use. For example, some prior methods involve using hydrophobic agents in the production process. These agents, however, may cause an increase in haze and a reduction in visible transmission. Researchers have tried to mitigate this undesirable effect by adding processing steps. One other mitigation step is to add expensive surfactants to control particle size in the silica wet gel. However, the wet gels then must be subjected to further processing, such as excessive solvent baths using expensive solvents, to remove the surfactants and excess hydrophobic agents. This additional processing is not only expensive, but it can actually cause deterioration in optical properties of the resulting silica aerogel.

It would be desirable to provide hydrophobic silica aerogel having a desirable combination of mechanical, thermal and/or optical properties. It would be particularly desirable to provide silica aerogel that is hydrophobic in combination with having high visible transmission and low haze, optionally together with certain advantageous mechanical properties. It would also be desirable to provide methods of making high quality hydrophobic silica aerogel that are commercially feasible and do not require expensive or excessive processing.

SUMMARY OF THE INVENTION

Figure 1:
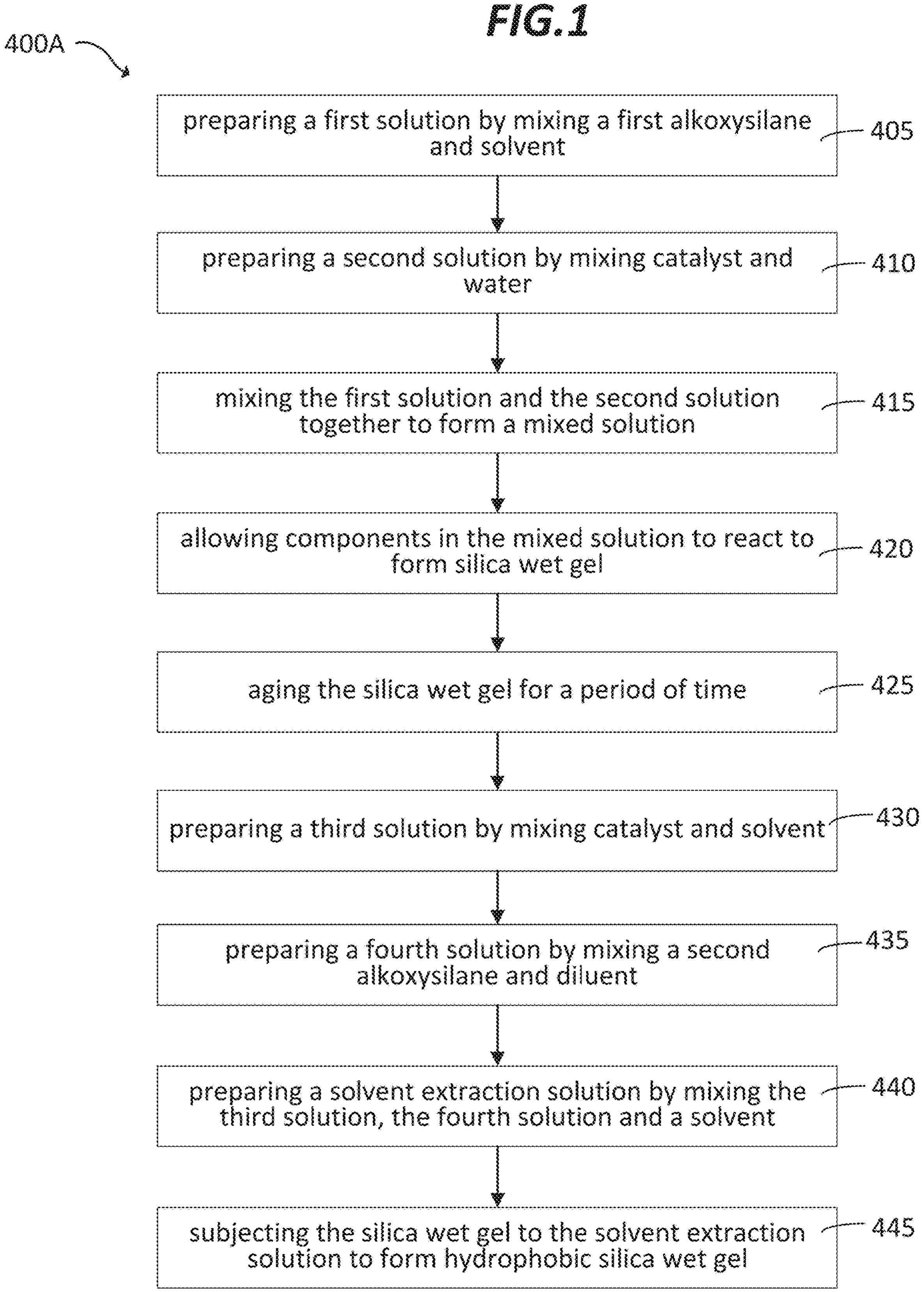
FIG. 1 is a flow chart depicting a method of making hydrophobic silica wet gel in accordance with certain embodiments.

Certain embodiments provide a method of making a hydrophobic silica wet gel. The method comprises steps of:

- preparing a first solution by mixing tetramethyl orthosilicate (also known as tetramethoxylsilane) ("TMOS") and solvent;
- preparing a second solution by mixing ammonium hydroxide and water;
- mixing the first solution and the second solution together to form a mixed solution;
- allowing components in the mixed solution to react to form silica wet gel;
- preparing a third solution by mixing ammonium hydroxide and solvent;
- preparing a fourth solution by mixing methyltrimethoxysilane ("MTMS") and diluent;
- preparing a solvent exchange solution by mixing the third solution, the fourth solution and solvent; and
- subjecting the silica wet gel to the solvent exchange solution to form a hydrophobic silica wet gel.

In some cases, the method makes a hydrophobic silica wet gel having density between 100 mg/cc and 200 mg/cc, and the TMOS is provided at a total weight percent of greater than or equal to 2.3% and less than or equal to 5.5% and the MTMS is provided at a total weight percent of greater than or equal to 0.5% and less than or equal to 0.8%. The total weight percent represents a total weight percent of a component in the first, second solution, third and fourth solutions. As an example, in certain cases, the total weight percent of the TMOS is greater than or equal to 2.3% and less than or equal to 5.5%, the total weight percent of the MTMS is greater than or equal to 0.5% and less than or equal to 0.8%, the methanol has a total weight percent of greater than or equal to 91.8% and less than or equal to 95.2%, the water has a total weight percent of greater than or equal to 1.9% and less than or equal to 2%, and the ammonium hydroxide has a total weight percent of greater than or equal to 0.013% and less than or equal to 0.015%.

In additional cases where the method makes a hydrophobic silica wet gel having a density between 100 mg/cc and 200 mg/cc, the first solution comprises TMOS at a weight percent of greater than or equal to 23.5% and less than or equal to 52%, methanol at a weight percent of greater than or equal to 48% and less than or equal to 76.5%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 26.8% and methanol at a weight percent of greater than or equal to 73.2% and less than or equal to 80.5%.

In other cases, the method makes a hydrophobic silica wet gel having a density between 120 mg/cc and 200 mg/cc, and the TMOS is provided at a total weight percent of greater than or equal to 2.8% and less than or equal to 5.5% and the MTMS is provided at a total weight percent of greater than or equal to 0.5% and less than or equal to 0.8%. As an example, in certain cases, the total weight percent of the TMOS is greater than or equal to 2.8% and less than or equal to 5.5%, the total weight percent of the MTMS is greater than or equal to 0.5% and less than or equal to 0.8%, the methanol has a total weight percent of greater than or equal to 91.8% and less than or equal to 94.7%, the water has a total weight percent of greater than or equal to 1.9% and less than or equal to 2%, and the ammonium hydroxide has a total weight percent of greater than or equal to 0.013% and less than or equal to 0.015%.

In other cases where the method makes a hydrophobic silica wet gel having density between 120 mg/cc and 200 mg/cc, the first solution comprises TMOS at a weight percent of greater than or equal to 28.4% and less than or equal to 52%, methanol at a weight percent of greater than or equal to 48% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 26.8% and methanol at a weight percent of greater than or equal to 73.2% and less than or equal to 80.5%.

In yet other cases, the method makes a hydrophobic silica wet gel having density between 120 mg/cc and 150 mg/cc, and the TMOS is provided at a total weight percent of greater than or equal to 2.8% and less than or equal to 4.3% and the MTMS is provided at a total weight percent of greater than or equal to 0.5% and less than or equal to 0.7%. As an example, in certain cases, the total weight percent of the TMOS is greater than or equal to 2.8% and less than or equal to 4.3%, the total weight percent of the MTMS is greater than or equal to 0.5% and less than or equal to 0.7%, the methanol has a total weight percent of greater than or equal to 93.1% and less than or equal to 94.7%, the water has a total weight percent of greater than or equal to 1.9% and less than or equal to 2%, and the ammonium hydroxide has a total weight percent of greater than or equal to 0.013% and less than or equal to 0.015%.

In even further cases where the method makes a hydrophobic silica wet gel having density between 120 mg/cc and 150 mg/cc, the first solution comprises TMOS at a weight percent of greater than or equal to 28.4% and less than or equal to 41.3%, methanol at a weight percent of greater than or equal to 58.7% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 23.3% and methanol at a weight percent of greater than or equal to 76.7% and less than or equal to 80.5%.

The method of making a hydrophobic silica wet gel can further include a step of aging the silica wet gel for a time period of at least 7 days (168 hours), at least 8 days (192 hours), at least 9 days (216 hours) or at least 10 days (240 hours). The method can further include a step of subjecting the hydrophobic silica wet gel to the solvent exchange solution for a time period of less than 24 hours. Further, the solvent can be selected from methanol, ethanol, 2-propanol, acetone, N,N-demethylformadide and demethylsulfoxide, and in some cases is methanol. The diluent can also be methanol in many cases. The method can also devoid of use of a surfactant.

Other embodiments include a method of making a hydrophobic silica aerogel that includes steps for making a hydrophobic silica aerogel discussed herein in addition to a step of drying the hydrophobic silica wet gel to form hydrophobic silica aerogel. Also, the drying step can involve subjecting the hydrophobic silica wet gel to drying to form the hydrophobic silica aerogel with a shrinkage value of 4% or less, for example 3.5% or less, 3% or less, 2.5% or less, 2% or less or 1.75% or less.

Other embodiments provide a hydrophobic silica aerogel synthesized from a precursor material and a hydrophobic agent. The hydrophobic silica aerogel can have a density of between 100 mg/cc and 200 mg/cc. The precursor material can comprise TMOS and the hydrophobic agent can comprise MTMS. In certain cases, the precursor material comprises TMOS, methanol, water and ammonium hydroxide. Also, in certain cases, the hydrophobic agent comprises the MTMS, methanol and ammonium hydroxide. The TMOS and the MTMS can be provided in a controlled amount selected to provide a molar ratio of TMOS:MTMS of greater than or equal to 0.98:1 and less than or equal to 1.43:1. In other cases, the density of the hydrophobic silica aerogel is between 120 mg/cc and 200 mg/cc, and the molar ratio of TMOS:MTMS is greater than or equal to 1.25:1 and less than or equal to 1.43:1. In yet other cases, the density of the hydrophobic silica aerogel is between 120 mg/cc and 150 mg/cc and the molar ratio of TMOS:MTMS is greater than or equal to 1.25:1 and less than or equal to 1.29:1. Additionally or alternatively, TMOS, MTMS and additional components can be provided having a total weight percent as discussed herein.

In some cases, the hydrophobic silica aerogel can be in the form of a hydrophobic silica aerogel sheet. The hydrophobic silica aerogel sheet can have a thickness of between 2 mm and 5 mm. Additionally or alternatively, the hydrophobic silica aerogel can have a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less. Also, the hydrophobic silica aerogel can have a water contact angle of at least 90°, for example at least 100° or at least 110°.

Other embodiments provide an article comprising a glass substrate and a hydrophobic silica aerogel sheet, the hydrophobic silica aerogel sheet being adhered to the glass substrate. Additional embodiments provide an insulating glazing unit comprising two glass sheets and a between-pane space, the between-pane space being located between the two glass sheets, the insulating glazing unit further comprising a hydrophobic silica aerogel sheet received in the between-pane space. The hydrophobic silica aerogel sheet can be adhered to an interior surface of one of the two glass sheets. Further embodiments provide a laminated glass assembly comprising two glass sheets and a hydrophobic silica aerogel sheet between the two glass sheets. The hydrophobic silica aerogel sheet in these embodiments can have any of the features described herein.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In the present specification, anywhere the terms "comprising" or "comprises" are used, those terms have their ordinary, open-ended meaning. In addition, where appropriate, the disclosure at each such location is to be understood to also disclose that it may, as an alternative, "consist essentially of" or "consist of."

Applicant has developed precursor materials, hydrophobic silica wet gel, hydrophobic silica aerogel and methods of making such materials that can be used to form enhanced silica aerogel sheets. The enhanced silica aerogel sheets can achieve an exceptional, surprising combination of optical, thermal and/or mechanical properties, which makes them highly advantageous for use in window applications.

The term "silica wet gel" refers to a material that is obtained by allowing components of a precursor material to react to form silica wet gel. The precursor material serves as an intermediate product that is used to form silica wet gel. Also, the term "silica aerogel" refers to material that is obtained by removing liquid from silica wet gel material and replacing the liquid with gas or vacuum. Further, the term "hydrophobic silica wet gel" refers to silica wet gel that resists absorbing moisture. Likewise, the term "hydrophobic silica aerogel" refers to silica aerogel that resists absorbing moisture.

Certain embodiments provide a precursor material and a hydrophobic agent for synthesizing a hydrophobic silica wet gel. The precursor material serves as an intermediate product that is used to form silica wet gel, which is treated with the hydrophobic agent to form a hydrophobic silica wet gel. The precursor material comprises a first alkoxysilane, and the hydrophobic agent comprises a second alkoxysilane.

Several reactions take place during silica wet gel synthesis: hydrolysis, condensation, nucleation and growth. These various reactions can have different reaction rates depending on the components used for the precursor material. The reaction rates affect mechanical, thermal and optical properties of a resulting silica aerogel. Thus, the resulting aerogel is extremely sensitive to variations in precursor material components and percentage of components. As an example, the hydrolysis reaction rate is determined by the amount of catalyst in the precursor material. The hydrolysis reaction is also exothermic, so it imparts heat to the precursor material, which in turn accelerates the condensation reaction rate. As a consequence, too much catalyst can accelerate the condensation reaction rate. Accelerated condensation reaction rates are undesirable since they can lead to an accelerated nucleation rate and an accelerated growth rate. Furthermore, if the growth rate exceeds the nucleation rate, the three-dimensional polymer structure will have unduly large particle sizes. Larger particle sizes create more scattering of light, which in turn leads to undesirable properties such as increased haze and reduced visible transmission. All of these variabilities make silica wet gel and aerogel synthesis unpredictable. Even more unpredictability occurs when hydrophobic agents are added to the synthesis process, since hydrophobic agents may agglomerate and cause increased haze and reduced visible transmission.

In some embodiments, the precursor material comprises a first alkoxysilane, solvent, water and base catalyst. The hydrophobic agent comprises a second alkoxysilane. In the present embodiments, the first alkoxysilane is TMOS and the second alkoxysilane is MTMS. In some cases, the precursor material comprises TMOS as the first alkoxysilane, solvent, water. In certain cases, the precursor material comprises TMOS as the first alkoxysilane, methanol as the solvent, water, and ammonium hydroxide as the base catalyst. Also, in some cases, the hydrophobic agent is a solvent extraction solution that includes MTMS as the second alkoxysilane, diluent, catalyst and solvent. In certain cases, the hydrophobic agent comprises a solvent extraction solution that includes MTMS as the second alkoxysilane, methanol as the diluent, ammonium hydroxide as the catalyst and methanol as the solvent. Applicant has identified a "sweet spot" of weight percentage ranges for these components along with a molar ratio range of TMOS:MTMS that can be used to form hydrophobic silica wet gel and hydrophobic silica aerogel having a surprising combination of optical, mechanical and/or thermal properties. Particular embodiments using specific methods, weight percentages and molar ratios will be discussed.

In some cases, components in a first solution, a second solution, a third solution and a fourth solution are present within selected weight percentages. Again, Applicant has identified recipe components along with a "sweet spot" of weight percentage ranges that can be used to form hydrophobic silica wet gel and hydrophobic silica aerogel having an exceptional combination of properties. As used herein, "weight percent" refers to weight percent of a component in a single solution (e.g., in the first solution, the second solution, the third solution, or the fourth solution). Further, as used herein, "total weight percent" refers to total weight percent of a component used to form hydrophobic silica wet gel. In the present embodiments, four solutions are used to form the hydrophobic silica wet gel, and the total weight percent of a component is the total weight percent of that component in the combination of the first solution, the second solution, the third solution and the fourth solution. The solvent exchange solution is simply a combination of the third solution, the fourth solution and additional solvent.

Some embodiments provide a method of making a hydrophobic silica wet gel. FIG. 1 illustrates a method 400A according to certain embodiments. The method includes a step 405 of preparing a first solution by mixing a first alkoxysilane and solvent, a step 410 of preparing a second solution by mixing catalyst and water, a step 415 of mixing the first solution and the second solution together to form a mixed solution, a step 420 of allowing components in the mixed solution to react to form silica wet gel, a step 425 of aging the silica wet gel for a period of time, a step 430 of preparing a third solution by mixing catalyst and solvent, a step 435 of preparing a fourth solution by mixing a second alkoxysilane and diluent, a step 440 of preparing a solvent exchange solution by mixing the third solution, the fourth solution and solvent, and a step 445 of subjecting the silica wet gel to the solvent extraction solution to form hydrophobic silica wet gel. In the method 400A, the solvent exchange solution serves as a hydrophobic agent.

In preferred embodiments, step 405 comprises preparing the first solution by mixing TMOS and methanol, step 410 comprises preparing a second solution by mixing methanol, ammonium hydroxide and water, step 430 comprises preparing a third solution by mixing ammonium hydroxide and methanol, step 435 comprises preparing a fourth solution by mixing MTMS and methanol and step 440 comprises preparing a solvent exchange solution by mixing the third solution, the fourth solution and methanol. In method 200A, hydrophobic treatment through the solvent exchange solution is performed after the silica wet gel aging is complete.

In some cases, the TMOS and MTMS are provided in a controlled amount to provide a molar ratio of the TMOS:MTMS of greater than or equal to 3.86:1 and less than or equal to 6.11:1. In specific cases, the molar ratio is greater than or equal to 3.86:1 and less than or equal to 5.79:1, such as greater than or equal to 3.86:1 and less than or equal to 4.83:1. In further cases, the molar ratio is greater than or equal to 4.83:1 and less than or equal to 6.11:1, such as greater than or equal to 4.83:1 and less than or equal to 5.79:1.

Also, in some cases, the TMOS has a total weight percent of greater than or equal to 2.3% and less than or equal to 5.5% and the MTMS has a total weight percent of greater than or equal to 0.5% and less than or equal to 0.8%. In certain cases, the TMOS has a total weight percent of greater than or equal to 2.3% and less than or equal to 4.3% and the MTMS has a total weight percent of greater than or equal to 0.5% and less than or equal to 0.7%. In yet other cases, the TMOS has a total weight percent of greater than or equal to 2.3% and less than or equal to 2.9% and the MTMS has a total weight percent of greater than or equal to 0.5% and less than or equal to 0.6%. In further cases, the TMOS has a total weight percent of greater than or equal to 2.8% and less than or equal to 5.5% and the MTMS has a total weight percent of greater than or equal to 0.5% and less than or equal to 0.8%. In even further cases, the TMOS has a total weight percent of greater than or equal to 2.8% and less than or equal to 4.3% and the MTMS has a total weight percent of greater than or equal to 0.5% and less than or equal to 0.7%.

In some cases, the method makes a hydrophobic silica wet gel having density between 100 mg/cc and 200 mg/cc, and the TMOS and MTMS are provided in a controlled amount selected to provide a molar ratio of TMOS:MTMS of greater than or equal to 3.86:1 and less than or equal to 6.11:1.

In other cases where the method makes a hydrophobic silica wet gel having density between 100 mg/cc and 200 mg/cc, the TMOS is provided at a total weight percent of greater than or equal to 2.3% and less than or equal to 5.5% and the MTMS is provided at a total weight percent of greater than or equal to 0.5% and less than or equal to 0.8%. The total weight percent represents a total weight percent of a component in the first, second solution, third and fourth solutions. As an example, in certain cases, the total weight percent of the TMOS is greater than or equal to 2.3% and less than or equal to 5.5%, the total weight percent of the MTMS is greater than or equal to 0.5% and less than or equal to 0.8%, the methanol has a total weight percent of greater than or equal to 91.8% and less than or equal to 95.2%, the water has a total weight percent of greater than or equal to 1.9% and less than or equal to 2%, and the ammonium hydroxide has a total weight percent of greater than or equal to 0.013% and less than or equal to 0.015%.

In additional cases where the method makes a hydrophobic silica wet gel having a density between 100 mg/cc and 200 mg/cc, the first solution comprises TMOS at a weight percent of greater than or equal to 23.5% and less than or equal to 52%, methanol at a weight percent of greater than or equal to 48% and less than or equal to 76.5%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 26.8% and methanol at a weight percent of greater than or equal to 73.2% and less than or equal to 80.5%.

In other cases, the method makes a hydrophobic silica wet gel having a density between 120 mg/cc and 200 mg/cc, and the TMOS and MTMS are provided in a controlled amount selected to provide a molar ratio of TMOS:MTMS of greater than or equal to 4.83:1 and less than or equal to 6.11:1.

In other cases where the method makes a hydrophobic silica wet gel having density between 120 mg/cc and 200 mg/cc, the TMOS is provided at a total weight percent of greater than or equal to 2.8% and less than or equal to 5.5% and the MTMS is provided at a total weight percent of greater than or equal to 0.5% and less than or equal to 0.8%. As an example, in certain cases, the total weight percent of the TMOS is greater than or equal to 2.8% and less than or equal to 5.5%, the total weight percent of the MTMS is greater than or equal to 0.5% and less than or equal to 0.8%, the methanol has a total weight percent of greater than or equal to 91.8% and less than or equal to 94.7%, the water has a total weight percent of greater than or equal to 1.9% and less than or equal to 2%, and the ammonium hydroxide has a total weight percent of greater than or equal to 0.013% and less than or equal to 0.015%.

In yet other cases where the method makes a hydrophobic silica wet gel having density between 120 mg/cc and 200 mg/cc, the first solution comprises TMOS at a weight percent of greater than or equal to 28.4% and less than or equal to 52%, methanol at a weight percent of greater than or equal to 48% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 26.8% and methanol at a weight percent of greater than or equal to 73.2% and less than or equal to 80.5%.

In yet other cases, the method makes a hydrophobic silica wet gel having density between 120 mg/cc and 150 mg/cc, and the TMOS and MTMS are provided in a controlled amount selected to provide a molar ratio of TMOS:MTMS of greater than or equal to 4.83:1 and less than or equal to 5.79:1.

In further cases where the method makes a hydrophobic silica wet gel having density between 120 mg/cc and 150 mg/cc, the TMOS is provided at a total weight percent of greater than or equal to 2.8% and less than or equal to 4.3% and the MTMS is provided at a total weight percent of greater than or equal to 0.5% and less than or equal to 0.7%. As an example, in certain cases, the total weight percent of the TMOS is greater than or equal to 2.8% and less than or equal to 4.3%, the total weight percent of the MTMS is greater than or equal to 0.5% and less than or equal to 0.7%, the methanol has a total weight percent of greater than or equal to 93.1% and less than or equal to 94.7%, the water has a total weight percent of greater than or equal to 1.9% and less than or equal to 2%, and the ammonium hydroxide has a total weight percent of greater than or equal to 0.013% and less than or equal to 0.015%.

In even further cases where the method makes a hydrophobic silica wet gel having density between 120 mg/cc and 150 mg/cc, the first solution comprises TMOS at a weight percent of greater than or equal to 28.4% and less than or equal to 41.3%, methanol at a weight percent of greater than or equal to 58.7% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises MTMS at a weight percent of greater than or equal to 19.5% and less than or equal to 23.3% and methanol at a weight percent of greater than or equal to 76.7% and less than or equal to 80.5%.

Exemplary embodiments of the method 400A will now be described. In some embodiments of the method 400A, the first solution comprises TMOS at a weight percent of greater than or equal to 23.55% and less than or equal to 51.96% and methanol at a weight percent of greater than or equal to 48.04% and less than or equal to 76.45%, and the second solution comprises water at a weight percent of about 99.69% and ammonium hydroxide at a weight percent of about 0.31%. The first solution and the second solution therefore form a mixed solution that comprises TMOS at a weight percent of greater than or equal to 19.63% and less than or equal to 43.82%, methanol at a weight percent of greater than or equal to 40.51% and less than or equal to 63.7%, water at a weight percent of greater than or equal to 15.62% and less than or equal to 16.62%, and ammonium hydroxide at a weight percent of about 0.05%. Further, the third solution comprises ammonium hydroxide at a weight percent of about 3.71% and methanol at a weight percent of about 96.29%, and the fourth solution comprises MTMS at a weight percent of greater than or equal to 19.54% and less than or equal to 26.7% and methanol at a weight percent of greater than or equal to 73.3% and less than or equal to 80.46%. The third solution and the fourth solution are combined with additional methanol to form the solvent exchange solution, which comprises MTMS at a weight percent of greater than or equal to 0.6% and less than or equal to 0.9%, methanol at a weight percent of greater than or equal to 99.09% and less than or equal to 99.39%, and ammonium hydroxide at a weight percent of about 0.01%. The resulting hydrophobic silica wet gel obtained by the method 400A is thereby synthesized from TMOS at a total weight percent of greater than or equal to 2.304% and less than or equal to 5.416%, MTMS at a total weight percent of greater than or equal to 0.532% and less than or equal to 0.793%, methanol at a total weight percent of greater than or equal to 91.847% and less than or equal to 95.198%, water at a total weight percent of greater than or equal to 1.930% and less than or equal to 1.95%, and ammonium hydroxide at a total weight percent of about 0.014%. The resulting hydrophobic silica wet gel also has a density of greater than or equal to 100 mg/cc and less than or equal to 200 mg/cc.

In other embodiments, the first solution comprises TMOS at a weight percent of greater than or equal to 23.55% and less than or equal to 41.23% and methanol at a weight percent of greater than or equal to 58.77% and less than or equal to 76.45%, and the second solution comprises water at a weight percent of about 99.69% and ammonium hydroxide at a weight percent of about 0.31%. The first solution and the second solution therefore form a mixed solution that comprises TMOS at a weight percent of greater than or equal to 19.63% and less than or equal to 34.74%, methanol at a weight percent of greater than or equal to 49.52% and less than or equal to 63.7%, water at a weight percent of greater than or equal to 15.69% and less than or equal to 16.62%, and ammonium hydroxide at a weight percent of about 0.05%. Further, the third solution comprises ammonium hydroxide at a weight percent of about 3.71% and methanol at a weight percent of about 96.29%, and the fourth solution comprises MTMS at a weight percent of greater than or equal to 19.54% and less than or equal to 23.28% and methanol at a weight percent of greater than or equal to 76.72% and less than or equal to 80.46%. The third solution and the fourth solution are combined with additional methanol to form the solvent exchange solution, which comprises MTMS at a weight percent of greater than or equal to 0.6% and less than or equal to 0.76%, methanol at a weight percent of greater than or equal to 99.23% and less than or equal to 99.39%, and ammonium hydroxide at a weight percent of about 0.01%. The resulting hydrophobic silica wet gel obtained by the method 400A is thereby synthesized from TMOS at a total weight percent of greater than or equal to 2.304% and less than or equal to 4.284%, MTMS at a total weight percent of greater than or equal to 0.532% and less than or equal to 0.662%, methanol at a total weight percent of greater than or equal to 93.106% and less than or equal to 95.198%, water at a total weight percent of greater than or equal to 1.934% and less than or equal to 1.95%, and ammonium hydroxide at a total weight percent of about 0.014%. The resulting hydrophobic silica wet gel also has a density of greater than or equal to 100 mg/cc and less than or equal to 150 mg/cc.

In further embodiments, the first solution comprises TMOS at a weight percent of greater than or equal to 23.55% and less than or equal to 28.41% and methanol at a weight percent of greater than or equal to 71.59% and less than or equal to 76.45%, and the second solution comprises water at a weight percent of about 99.69% and ammonium hydroxide at a weight percent of about 0.31%. The first solution and the second solution therefore form a mixed solution that comprises TMOS at a weight percent of greater than or equal to 19.63% and less than or equal to 23.81%, methanol at a weight percent of greater than or equal to 6% and less than or equal to 63.7%, water at a weight percent of greater than or equal to 16.13% and less than or equal to 16.62%, and ammonium hydroxide at a weight percent of about 0.05%. Further, the third solution comprises ammonium hydroxide at a weight percent of about 3.71% and methanol at a weight percent of about 96.29%, and the fourth solution comprises MTMS at a weight percent of about 19.54% and methanol at a weight percent of about 80.46%. The third solution and the fourth solution are combined with additional methanol to form the solvent exchange solution, which comprises MTMS at a weight percent of about 0.6%, methanol at a weight percent of about 99.39%, and ammonium hydroxide at a weight percent of about 0.01%. The resulting hydrophobic silica wet gel obtained by the method 400A is thereby synthesized from TMOS at a total weight percent of greater than or equal to 2.304% and less than or equal to 2.869%, MTMS at a total weight percent of greater than or equal to 0.532% and less than or equal to 0.534%, methanol at a total weight percent of greater than or equal to 94.642% and less than or equal to 95.198%, water at a total weight percent of greater than or equal to 1.943% and less than or equal to 1.95%, and ammonium hydroxide at a total weight percent of about 0.014%. The resulting hydrophobic silica wet gel also has a density of greater than or equal to 100 mg/cc and less than or equal to 120 mg/cc.

Additionally, in some embodiments, the first solution comprises TMOS at a weight percent of greater than or equal to 28.41% and less than or equal to 51.96% and methanol at a weight percent of greater than or equal to 48.04% and less than or equal to 71.59%, and the second solution comprises water at a weight percent of about 99.69% and ammonium hydroxide at a weight percent of about 0.31%. The first solution and the second solution therefore form a mixed solution that comprises TMOS at a weight percent of greater than or equal to 23.81% and less than or equal to 43.82%, methanol at a weight percent of greater than or equal to 40.51% and less than or equal to 60%, water at a weight percent of greater than or equal to 15.62% and less than or equal to 16.13%, and ammonium hydroxide at a weight percent of about 0.05%. Further, the third solution comprises ammonium hydroxide at a weight percent of about 3.71% and methanol at a weight percent of about 96.29%, and the fourth solution comprises MTMS at a weight percent of greater than or equal to 19.54% and less than or equal to 26.7% and methanol at a weight percent of greater than or equal to 73.3% and less than or equal to 80.46%. The third solution and the fourth solution are combined with additional methanol to form the solvent exchange solution, which comprises MTMS at a weight percent of greater than or equal to 0.6% and less than or equal to 0.9%, methanol at a weight percent of greater than or equal to 99.09% and less than or equal to 99.39%, and ammonium hydroxide at a weight percent of about 0.01%. The resulting hydrophobic silica wet gel obtained by the method 400A is thereby synthesized from TMOS at a total weight percent of greater than or equal to 2.869% and less than or equal to 5.416%, MTMS at a total weight percent of greater than or equal to 0.532% and less than or equal to 0.793%, methanol at a total weight percent of greater than or equal to 91.847% and less than or equal to 94.642%, water at a total weight percent of greater than or equal to 1.930% and less than or equal to 1.943%, and ammonium hydroxide at a total weight percent of about 0.014%. The resulting hydrophobic silica wet gel also has a density of greater than or equal to 120 mg/cc and less than or equal to 200 mg/cc.

In further embodiments, the first solution comprises TMOS at a weight percent of greater than or equal to 28.41% and less than or equal to 41.23% and methanol at a weight percent of greater than or equal to 58.77% and less than or equal to 71.59%, and the second solution comprises water at a weight percent of about 99.69% and ammonium hydroxide at a weight percent of about 0.31%. The first solution and the second solution therefore form a mixed solution that comprises TMOS at a weight percent of greater than or equal to 23.81% and less than or equal to 34.74%, methanol at a weight percent of greater than or equal to 49.52% and less than or equal to 60%, water at a weight percent of greater than or equal to 15.69% and less than or equal to 16.13%, and ammonium hydroxide at a weight percent of about 0.05%. Further, the third solution comprises ammonium hydroxide at a weight percent of about 3.71% and methanol at a weight percent of about 96.29%, and the fourth solution comprises MTMS at a weight percent of greater than or equal to 19.54% and less than or equal to 23.28% and methanol at a weight percent of greater than or equal to 76.72% and less than or equal to 80.46%. The third solution and the fourth solution are combined with additional methanol to form the solvent exchange solution, which comprises MTMS at a weight percent of greater than or equal to 0.6% and less than or equal to 0.76%, methanol at a weight percent of greater than or equal to 99.24% and less than or equal to 99.39%, and ammonium hydroxide at a weight percent of about 0.01%. The resulting hydrophobic silica wet gel obtained by the method 400A is thereby synthesized from TMOS at a total weight percent of greater than or equal to 2.869% and less than or equal to 4.284%, MTMS at a total weight percent of greater than or equal to 0.532% and less than or equal to 0.662%, methanol at a total weight percent of greater than or equal to 93.106% and less than or equal to 94.642%, water at a total weight percent of greater than or equal to 1.934% and less than or equal to 1.943%, and ammonium hydroxide at a total weight percent of about 0.014%. The resulting hydrophobic silica wet gel also has a density of greater than or equal to 120 mg/cc and less than or equal to 150 mg/cc.

In each of the embodiments discussed herein, the selected time period for aging is a time period in which the aging process reaches saturation. Once saturation has occurred, no further structural transformation of the wet gel occurs. Applicant has discovered that optimal properties are obtained when the selected time period is a time period of at least 7 days (168 hours), at least 8 days (192 hours), at least 9 days (216 hours) or at least 10 days (240 hours). Additionally, warping of the hydrophobic silica wet gel often takes place during subsequent processes. For example, in many cases, silica wet gel shrinks during drying. However, Applicant has found that a time period of at least 7 days helps prevent warping such as shrinking.

Figure 2:
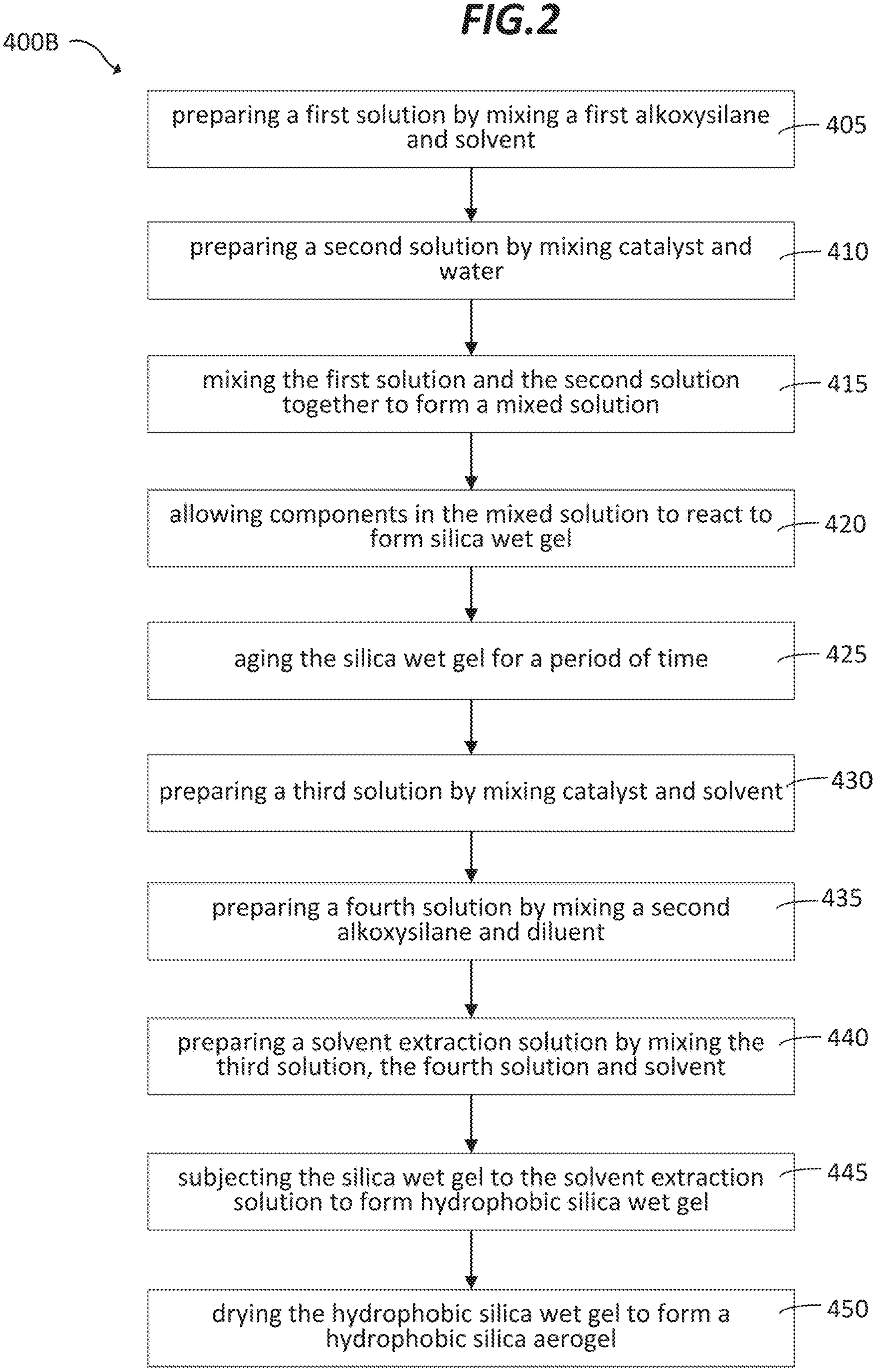
FIG. 2 is a flow chart depicting a method of making hydrophobic silica aerogel in accordance with certain embodiments.

Other embodiments provide a method of making hydrophobic silica aerogel. FIG. 2 illustrates method 400B according to certain embodiments. The method 400B comprises steps 405 through 445 of making hydrophobic silica wet gel as described with regard to method 400A in FIG. 1, in addition to a step 450 of drying the hydrophobic silica wet gel to form hydrophobic silica aerogel.

In many cases, the drying step results in a hydrophobic silica aerogel having a shrinkage value of 4% or less, for example 3.5% or less, 3% or less, 2.5% or less, 2% or less or 1.75% or less. Also, in some cases, the drying step results in hydrophobic silica aerogel having a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less. Further, in some cases, the drying step results in hydrophobic silica aerogel having a water contact angle of at least 90%, for example at least 100% or at least 110%.

In certain embodiments, the hydrophobic silica wet gel is dried using a conventional aerogel drying method. In many cases, the hydrophobic silica wet gel is placed in either a freeze dryer, a supercritical dryer, or an ambient dryer. In such instances, the step 245 of drying the hydrophobic silica wet gel comprises either a freeze-drying process, a supercritical drying process, or an ambient drying process.

In some cases, the hydrophobic silica wet gel is dried using a supercritical drying method (also known as a critical point drying method). As is well-known to skilled artisans, supercritical drying involves a solvent exchange. Specifically, the water initially inside the hydrophobic silica wet gel is replaced with a suitable organic solvent (e.g., methanol, ethanol, or acetone). The hydrophobic silica wet gel is then placed in a pressure vessel along with liquid carbon dioxide. The pressure vessel may be filled with, and emptied of, liquid carbon dioxide multiple times, so as to remove the organic solvent and leave liquid carbon dioxide in its place. The liquid carbon dioxide is then heated past its critical temperature and pressure and removed, thereby leaving a hydrophobic silica aerogel.

Applicant has achieved great results when using methanol as the organic solvent in the solvent exchange. By using methanol as the solvent, the resulting aerogel material has less haze and less optical distortion than with other solvents. In certain embodiments, the hydrophobic silica wet gel can be placed in a methanol solvent bath for 8 hours, removed and then placed in another methanol solvent bath for 8 more hours. The total time period in which the hydrophobic silica wet gel is in the solvent bath can be less than 20 hours, such as less than 17 hours. This is desirable as longer solvent processing time can lead to deterioration in optical properties. Additionally, a shorter solvent processing time is advantageous for commercial production.

In other cases, the hydrophobic silica wet gel is dried using an ambient drying method. As used herein, ambient drying involves drying the hydrophobic silica wet gel under ambient conditions (e.g., at a temperature in a range of from about 50 degrees to about 85 degrees Fahrenheit, and more typically in a range of from 68 degrees to 72 degrees Fahrenheit). The liquid in the hydrophobic silica wet gel is allowed to slowly evaporate under controlled conditions, leaving a hydrophobic silica aerogel. The controlled conditions ensure that the evaporation is slow enough so that the silica network of the gel does not collapse during the drying. With ambient drying, the dryer is configured to establish a controlled environment in its interior. This may involve a controlled temperature, a controlled pressure, a controlled airflow, a controlled humidity, or any combination thereof.

In still other cases, the hydrophobic silica wet gel is dried using a freeze-drying method. The hydrophobic silica wet gel is frozen and then put into a vacuum chamber. The solvent is then removed to leave a hydrophobic silica aerogel. Any suitable freeze-drying technique known in the art may be used. As non-limiting examples, the hydrophobic silica wet gel can be placed into a household freezer, liquid nitrogen, or in a cryogenic mixture (e.g., a dry-ice/solvent mixture, such as a dry-ice and acetone bath).

Other fabrication techniques can be used, such as a rapid supercritical extraction technique. Reference is made to U.S. Pat. No. 8,080,591, the salient teachings of which are incorporated herein by reference.

In some cases, the hydrophobic silica aerogel is provided in the form of a hydrophobic silica aerogel sheet. This is in contrast to aerogel in flowable granular or otherwise particulate form. The hydrophobic silica aerogel sheet preferably is self-supporting, i.e., once fully synthesized and formed, the sheet can retain sheet form without being adhered to glass or another support. This can optionally be the case for any embodiment of the present disclosure involving a hydrophobic silica aerogel sheet.

The hydrophobic silica aerogel sheet is an enhanced sheet having an advantageous combination of properties. First, the hydrophobic silica aerogel sheet desirably has low haze. For any embodiment involving a hydrophobic silica aerogel sheet, the haze can optionally be less than or equal to 4%, such as less than or equal to 3%, e.g., less than or equal to 2.5%, less than or equal to 2%, or less than or equal to 1.75%. In some cases, the hydrophobic silica aerogel sheet has a haze of less than or equal to 1.5%, less than or equal to 1.25%, or even less than or equal to 1%. This preferably is the case for any embodiment involving a hydrophobic silica aerogel sheet. Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The hydrophobic silica aerogel sheet desirably has high visible transmission. In some cases, the hydrophobic silica aerogel sheet has a visible transmission of at least 97.8%, at least 97.9%, at least 98%, at least 98.1%, at least 98.2%, at least 98.3%, at least 98.4%, at least 98.5%, at least 98.6%, at least 98.7%, at least 98.8%, at least 98.9%, or at least 99%, such as at least 99.1%, at least 99.2%, at least 99.3%, at least 99.4%, or perhaps at least 99.5%. The term "visible transmission" is well known in the art and is used herein in accordance with its well-known meaning to refer to the percentage of all incident visible radiation that is transmitted through an object (e.g., through the hydrophobic silica aerogel sheet). Visible radiation constitutes the wavelength range of between about 380 nm and about 780 nm. Visible transmission, as well as visible reflection, can be determined in accordance with NFRC 300-2017, Standard Test Method for Determining the Solar and Infrared Optical Properties of Glazing Materials and Fading Resistance of Systems. The well-known and commercially available LBNL WINDOW 7.4 computer program can be used in calculating these and other reported optical properties.

The hydrophobic silica aerogel sheet can also have desirable transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent the conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, the hydrophobic silica aerogel sheet can have a low bulk density. In certain embodiments, the hydrophobic silica aerogel sheet has a bulk density of 200 mg/cc or less. In some cases, the hydrophobic silica aerogel sheet has a bulk density of 150 mg/cc or less, such as 140 mg/cc or less, 130 mg/cc or less, or 125 mg/cc or less. In certain embodiments, the hydrophobic silica aerogel sheet has a bulk density of at least 70 mg/cc. In some cases, the hydrophobic silica aerogel sheet has a bulk density of at least 80 mg/cc, such as at least 85 mg/cc or at least 95 mg/cc. In preferred embodiments, the hydrophobic silica aerogel sheet has a bulk density of between 100 mg/cc and 150 mg/cc, such as between 120 mg/cc and 150 mg/cc. In certain cases, the bulk density is 120 mg/cc. The density of the hydrophobic silica aerogel sheet can optionally be in this range for any embodiment of the present disclosure, preferably in combination with visible transmission and haze levels in the ranges noted above (e.g., $T_{vis}$ of at least 97.8%, at least 98%, at least 98.6% or at least 99%, together with a haze of 3% or less, 2% or less, 1.75% or less, or 1.5% or less). Bulk density can be determined by weighing the hydrophobic silica aerogel sheet and then calculating the volume using the dimensions of the hydrophobic silica aerogel sheet.

The hydrophobic silica aerogel sheet can also have low thermal conductivity. For example, the hydrophobic silica aerogel sheet can have a thermal conductivity of 14 mW/m*K or less in air, such as 13.5 mW/m*K or less, 13 mW/m*K or less, 12 mW/m*K or less, or 11.5 mW/m*K or less. Furthermore, the hydrophobic silica aerogel sheet can have a thermal conductivity of 10 mW/m*K or less in an inert gas, such as argon. The thermal conductivity of the hydrophobic silica aerogel sheet can optionally be in one or more (optionally all) of these ranges for any embodiment of the present disclosure. Thermal conductivity can be determined using a conventional heat flow meter, such as the well-known TA Instruments Fox 200 heat flow meter, which is commercially available from Waters Corporation (New Castle, Delaware, U.S.A.).

Further, the hydrophobic silica aerogel sheet can have a flexural modulus of 6000 kPa or less, such as 4500 kPa or less, 2400 kPa or less, 2300 kPa or less, 2000 kPa or less, 1900 kPa or less, 1800 kPa or less, 1700 kPa or less, 1600 kPa or less, 1500 kPa or less, 1400 kPa or less, 1300 kPa or less, 1200 kPa or less, 1100 kPa or less, 1000 kPa or less, 900 kPa or less, 800 kPa or less, 750 kPa or less, or even 700 kPa or less. In some cases, the hydrophobic silica aerogel sheet can have a flexural modulus of between 700 kPa and 6000 kPa, such as between 750 kPa and 6000 kPa, between 800 kPa and 6000 kPa, between 900 kPa and 6000 kPa, between 1000 kPa and 6000 kPa, between 1100 kPa and 6000 kPa, between 1200 kPa and 6000 kPa, between 1300 kPa and 6000 kPa, between 1400 kPa and 6000 kPa, between 1500 kPa and 6000 kPa, between 1600 kPa and 6000 kPa, between 1700 kPa and 6000 kPa, between 1800 kPa and 6000 kPa, between 1900 kPa and 6000 kPa, between 2000 kPa and 6000 kPa, between 2300 kPa and 6000 kPa and between 2400 kPa and 6000 kPa.

The flexural modulus of a material is a mechanical property that measures a material's stiffness or resistance to bending and is defined as the ratio of stress to strain in flexural deformation. It is determined from the slope of a stress-strain curve produced by a flexural test, such as ASTM D790: Standard Test Methods for Flexural Properties of Unreinforced and Reinforced Plastics and Electrical Insulating Material, the contents of which are incorporated herein by reference. The higher the flexural modulus of a material, the harder it is to bend. Conversely, the lower the flexural modulus, the easier it is for the material to bend under an applied force.

Even further, the hydrophobic silica aerogel sheet can have an average pore size of 31 nm or less, such as 30 nm or less, 29 nm or less, 28 nm or less, 27 nm or less, 26 nm or less, 25 nm or less, 24 nm or less, 23 nm or less, 22 nm or less, 21 nm or less, or even 20 nm or less. This can optionally be the case for any embodiment of the present disclosure that involves the silica aerogel sheet. The average pore size can be determined using a Quantachrome "autosorb-iQ" gas absorption analyzer, which is commercially available from Anton Paar (Graz, Austria) along with calculating average pore size using density functional theory (DFT) calculations.

The silica aerogel sheet can also have a specific surface area of at least 750 $m^2/g$, such as at least 800 $m^2/g$, at least 850 $m^2/g$, at least 900 $m^2/g$, at least 950 $m^2/g$, or at least 1000 $m^2/g$. This can optionally be the case for any embodiment of the present disclosure that involves the hydrophobic silica aerogel sheet, preferably in combination with an average pore diameter in one or more (optionally all) of the ranges noted in the paragraph above and/or in combination with a density of between 100 mg/cc and 150 mg/cc, optionally in further combination with visible transmission and haze levels in the ranges noted above (e.g., $T_{vis}$ of at least 97.8%, perhaps at least 98%, at least 98.6%, or at least 99%, together with haze of 3% or less, 2% or less, 1.75% or less, or 1.5% or less). The specific surface area can also be determined using a Quantachrome "autosorb-iQ" gas absorption analyzer, which is commercially available from Anton Paar (Graz, Austria) along with calculating specific surface area using density functional theory (DFT) calculations.

Further, the silica aerogel sheet can have a water contact angle of at least 90°, such as at least 95°, at least 100°, at least 105°, at least 110°, at least 115°, at least 120°, or at least 125°. A Ramé-Hart Contact Angle Goniometer (Model No. 100-00) was used for the detection of static contact angle measurement. The measurement was performed by using a traditional sessile drop technique.

The silica aerogel sheet can also have a linear shrinkage (X/Y direction) of 4% or less, 3.5% or less, 3% or less, 2.5% or less, 2% or less, 1.75% or less, or perhaps 1.7% or less. Sample images were taken with a regular camera with known scale. The images were analyzed with image J software and the final length of the aerogel was determined after CPD drying with respect to the known initial length (Initial length-120 mm).

Certain embodiments provide a hydrophobic silica aerogel sheet synthesized from TMOS and MTMS and having a visible transmission of at least 97.8% and a haze value of 3% or less. The hydrophobic silica aerogel sheet can also include at least one of the following features (A) through (E):

(A) a water contact angle of at least 90°;

(B) a thermal conductivity in air of 13.5 mW/m·K or less;

(C) a flexural modulus of 6000 kPa or less;

(D) a specific surface area of at least 750 $m^2/g$;

(E) an average pore diameter of 30 nm or less.

The hydrophobic silica aerogel sheet can optionally include at least two of the features (A) through (E), at least three of the features (A) through (E), at least four of the features (A) through (E), or all of the features (A) through (E). Also, in some cases, the visible transmission of the hydrophobic silica aerogel sheet is at least 98.6%, and the haze value is 2.5% or less. In further cases, the visible transmission of the hydrophobic silica aerogel sheet is at least 99%, and the haze value is 2% or less. The water contact angle in feature (A) can optionally be at least 100°, such as at least 110° or at least 120°. The flexural modulus in feature (C) can optionally be 4500 kPa or less. Further, the specific surface area in feature (D) can optionally be at least 800 $m^2$/g. Even further, the average pore diameter in feature (E) can optionally be 27 nm or less.

Other embodiments provide a hydrophobic silica aerogel sheet synthesized TMOS and MTMS and having a visible transmission of at least 98% and a haze value of 2% or less. The hydrophobic silica aerogel sheet can also include at least one of the following features (A) through (E):

(A) a water contact angle of at least 110°;
(B) a thermal conductivity in air of 13 mW/m·K or less;
(C) a flexural modulus of 6000 kPa or less;
(D) a specific surface area of at least 750 $m^2$/g;
(E) an average pore diameter of 29 nm or less.

Again, the hydrophobic silica aerogel sheet can optionally include at least two of the features (A) through (E), at least three of the features (A) through (E), at least four of the features (A) through (E), or all of the features (A) through (E).

Other embodiments provide a hydrophobic silica aerogel sheet synthesized from TMOS and MTMS and having a visible transmission of at least 98.6% and a haze value of 1.5% or less. The hydrophobic silica aerogel sheet can also include at least one of the following features (A) through (E):

(A) a water contact angle of at least 120°;
(B) a thermal conductivity in air of 13 mW/m·K or less;
(C) a flexural modulus of 6000 kPa or less;
(D) a specific surface area of at least 900 $m^2$/g;
(E) an average pore diameter of 28 nm or less.

Here too, the hydrophobic silica aerogel sheet can optionally include at least two of the features (A) through (E), at least three of the features (A) through (E), at least four of the features (A) through (E) or all of the features (A) through (E).

EXAMPLES

Exemplary hydrophobic silica aerogel sheets (Examples #1-#4) were prepared using TMOS and MTMS at densities of 100 mg/cc, 120 mg/cc, 150 mg/cc, and 200 mg/cc. In these examples, a catalyst step was included and hydrophobization took place in the first solvent bath. Properties obtained for hydrophobic silica aerogel sheets in these examples were also measured using methods described herein and tabulated in Table 1.

Example #1 (TMOS/MTMS at 3.86:1 Ratio at 100 mg/cc)

Example #1 was prepared according to the following steps:

A. Preparing a first solution by mixing 8 mL TMOS and 34 mL methanol. The weight percent of the first solution included TMOS at a weight percent of 23.55% and methanol at a weight percent of 76.45%.
B. Preparing a second solution by mixing 0.024 mL ammonium hydroxide and 6.976 mL water. The weight percent of the second solution included water at a weight percent of 99.69% and ammonium hydroxide at a weight percent of 0.31%.
C. Mixing the first solution and second solution together to form a mixed solution. The weight percent of the mixed solution included TMOS at a weight percent of 19.63%, methanol at a weight percent of 63.7%, water at a weight percent of 16.62%, and ammonium hydroxide at a weight percent of 0.05%.
D. Depositing the mixed solution into a mold having interior dimensions of 5 inches by 5 inches by 3.5 mm. Sealing the mold to provide an airtight environment.
E. Allowing components in the mixed solution to react to form a silica wet gel sheet having dimensions of 5 inches by 5 inches by 3.5 mm.
F. Aging the silica wet gel sheet in the mold at room temperature for a time period of 240 hours.
G. Preparing a third solution by mixing 0.03 mL ammonium hydroxide and 0.9 mL methanol. The weight percent of the third solution included ammonium hydroxide at a weight percent of 3.71% and methanol at a weight percent of 96.29%.
H. Preparing a fourth solution by mixing 2 mL MTMS and 10 mL methanol. The weight percent of the fourth solution included MTMS at a weight percent of 19.54% and methanol at a weight percent of 80.46%.
I. Preparing a solvent exchange solution by mixing the third solution, the fourth solution and 388 mL methanol. The weight percent of all components used to form the solvent exchange solution included MTMS at a weight percent of 0.6%, methanol at a weight percent of 99.39%, and ammonium hydroxide at a weight percent of 0.01%.
J. Removing the silica wet gel sheet from the mold.
K. Placing the silica wet gel sheet in a first solvent bath containing the solvent exchange solution and allowing hydrophobization and solvent exchange to take place for 8 hours. The total weight percent of all components used to form the hydrophobic silica wet gel sheet of Example #1 is listed in Table 1.
L. Placing the hydrophobic silica wet gel sheet in a second solvent bath that includes methanol and allowing solvent exchange to take place for 8 more hours.
M. Placing the hydrophobic wet gel sheet in a dryer and performing critical point drying with a complete $CO_2$ exchange to obtain a hydrophobic silica aerogel sheet.

Properties obtained for the resulting hydrophobic silica aerogel sheet of Example #1 are also shown in Table 1.

Example #2 (TMOS/MTMS at 4.83:1 Ratio at 120 mg/cc)

Example #2 was prepared according to the following steps:

A. Preparing a first solution by mixing 10 mL TMOS and 33 mL methanol. The weight percent of the first solution included TMOS at a weight percent of 28.41% and methanol at a weight percent of 71.59%.
B. Preparing a second solution by mixing 0.024 mL ammonium hydroxide and 6.976 mL water. The weight percent of the second solution included water at a weight percent of 99.69% and ammonium hydroxide at a weight percent of 0.31%.
C. Mixing the first solution and second solution together to form a mixed solution. The weight percent of the mixed solution included TMOS at a weight percent of 23.81%, methanol at a weight percent of 60.01%, water at a weight percent of 16.13%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 0.03 mL ammonium hydroxide and 0.9 mL methanol. The weight percent of the third solution included ammonium hydroxide at a weight percent of 3.71% and methanol at a weight percent of 96.29%.

H. Preparing a fourth solution by mixing 2 mL MTMS and 10 mL methanol. The weight percent of the fourth solution included MTMS at a weight percent of 19.54% and methanol at a weight percent of 80.46%.

I. Preparing a solvent exchange solution by mixing the third solution, the fourth solution and 288 mL methanol. The weight percent of all components used to form the solvent exchange solution included MTMS at a weight percent of 0.6%, methanol at a weight percent of 99.39%, and ammonium hydroxide at a weight percent of 0.01%. Steps J through M were repeated as performed in Example #1. The total weight percent of all components used to form the hydrophobic silica wet gel sheet of Example #2 is listed in Table 1. Properties obtained for the resulting hydrophobic silica aerogel sheet of Example #2 are also shown in Table 1.

Example #3 (TMOS/MTMS at 5.79:1 Ratio at 150 mg/cc)

Example #3 was prepared according to the following steps:

A. Preparing a first solution by mixing 15 mL TMOS and 28 mL methanol. The weight percent of the first solution included TMOS at a weight percent of 41.23% and methanol at a weight percent of 58.77%.

B. Preparing a second solution by mixing 0.024 mL ammonium hydroxide and 6.976 mL water. The weight percent of the second solution included water at a weight percent of 99.69% and ammonium hydroxide at a weight percent of 0.31%.

C. Mixing the first solution and second solution together to form a mixed solution. The weight percent of the mixed solution included TMOS at a weight percent of 34.74%, methanol at a weight percent of 49.52%, water at a weight percent of 15.69%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 0.03 mL ammonium hydroxide and 0.9 mL methanol. The weight percent of the third solution include ammonium hydroxide at a weight percent of 3.71% and methanol at a weight percent of 96.29%.

H. Preparing a fourth solution by mixing 2.5 mL MTMS and 10 mL methanol. The weight percent of the fourth solution included MTMS at a weight percent of 23.28% and methanol at a weight percent of 76.72%.

I. Preparing a solvent exchange solution by mixing the third solution, the fourth solution and 388 mL methanol. The weight percent of all components used to form the solvent exchange solution included MTMS at a weight percent of 0.76%, methanol at a weight percent of 99.23%, and ammonium hydroxide at a weight percent of 0.01%.

Steps J through M were repeated as performed in Example #1. The total weight percent of all components used to form the hydrophobic silica wet gel sheet of Example #3 is listed in Table 1. Properties obtained for the resulting hydrophobic silica aerogel sheet of Example #3 are also shown in Table 1.

Example #4 (TMOS/MTMS at 6.11:1 Ratio at 200 mg/cc)

Example #4 was prepared according to the following steps:

A. Preparing a first solution by mixing 19 mL TMOS and 23 mL methanol. The weight percent of the first solution included TMOS at a weight percent of 51.96% and methanol at a weight percent of 48.04%.

B. Preparing a second solution by mixing 0.024 mL ammonium hydroxide and 6.976 mL water. The weight percent of the second solution included water at a weight percent of 99.69% and ammonium hydroxide at a weight percent of 0.31%.

C. Mixing the first solution and second solution together to form a mixed solution. The weight percent of the mixed solution included TMOS at a weight percent of 43.82%, methanol at a weight percent of 40.51%, water at a weight percent of 15.62%, and ammonium hydroxide at a weight percent of 0.05%.

D. Depositing the mixed solution into a mold having interior dimensions of 5 inches by 5 inches by 3.5 mm. Sealing the mold to provide an airtight environment.

E. Allowing components in the mixed solution to react to form a silica wet gel sheet having dimensions of 5 inches by 5 inches by 3.5 mm.

F. Aging the silica wet gel sheet in the mold at room temperature for a time period of 240 hours.

G. Preparing a third solution by mixing 0.03 mL ammonium hydroxide and 0.9 mL methanol. The weight percent of the third solution included ammonium hydroxide at a weight percent of 3.71% and methanol at a weight percent of 96.29%.

H. Preparing a fourth solution by mixing 3 mL MTMS and 10 mL methanol. The weight percent of the fourth solution included MTMS at a weight percent of 26.7% and methanol at a weight percent of 73.3%.

I. Preparing a solvent exchange solution by mixing the third solution, the fourth solution and 388 mL methanol. The weight percent of all components used to form the solvent exchange solution included MTMS at a weight percent of 0.9%, methanol at a weight percent of 99.09%, and ammonium hydroxide at a weight percent of 0.01%.

Steps J through M were repeated as performed in Example #1. The total weight percent of all components used to form the hydrophobic silica wet gel sheet of Example #4 is listed in Table 1. Properties obtained for the resulting hydrophobic silica aerogel sheet of Example #4 are also shown in Table 1.

TABLE 1

| | Example #1 | Example #2 | Example #3 | Example #4 |
|---|---|---|---|---|
| Density | 100 mg/cc | 120 mg/cc | 150 mg/cc | 200 mg/cc |
| TMOS | 2.304 wt % | 2.869 wt % | 4.284 wt % | 5.416 wt % |
| MTMS | 0.534 wt % | 0.532 wt % | 0.662 wt % | 0.793 wt % |
| Methanol | 95.198 wt % | 94.642 wt % | 93.106 wt % | 91.847 wt % |
| Water | 1.950 wt % | 1.943 wt % | 1.934 wt % | 1.930 wt % |
| $NH_4OH$ | 0.014 wt % | 0.014 wt % | 0.014 wt % | 0.014 wt % |
| TMOS:MTMS Molar Ratio | 3.86:1 | 4.83:1 | 5.79:1 | 6.11:1 |
| Visible Transmission | 98-99% | 98-99% | 98-99% | 98-99% |
| Haze | 1.20-1.3 | 1.28-1.42 | 1.55-1.73 | 1.54-1.93 |
| Water Contact Angle | 120 | 120 | 120 | 120 |
| Thermal Conductivity | 11-13 mW/m · K | 11-13 mW/m · K | 11-13 mW/m · K | 11-13 mW/m · K |
| Specific Surface Area | 900-1000 | 800-950 | 800-860 | 750-800 |
| Average Pore Size | 16-19 | 18-23 | 18-27 | 19-30 |
| Shrinkage | 1.6-2.5% | 2-2.5% | 2-3% | 2-3.5% |
| Thickness | 3.5 mm | 3.5 mm | 3.5 mm | 3.5 mm |

Some embodiments provide an article 10 comprising a hydrophobic silica aerogel sheet as described herein. The article is not limited to window and other glazing applications, but rather can be any article designed to provide thermal insulation. For example, the hydrophobic silica aerogel sheet can be provided on articles such as glass, solar panels, vehicle roofs, walls of refrigerated trucks, walls of buildings and more.

Figure 3:
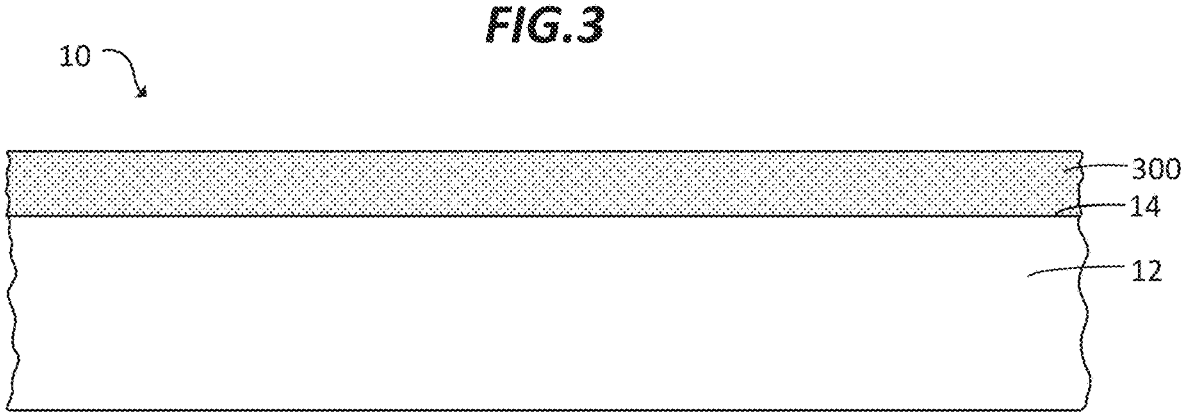
FIG. 3 is a schematic, broken-away, cross-sectional side view of an article that includes a glass sheet and a hydrophobic silica aerogel sheet in accordance with certain embodiments.

FIG. 3 illustrates an article 10 comprising a glass sheet 12 and a hydrophobic silica aerogel sheet 300. The hydrophobic silica aerogel sheet 300 is adhered to or otherwise carried or mounted alongside the glass sheet 12. The hydrophobic silica aerogel sheet 300 can have any of the features and properties discussed elsewhere herein.

The hydrophobic silica aerogel sheet 300 preferably is adhered to a surface 14 of the glass sheet 12. By saying the hydrophobic silica aerogel sheet 300 is "adhered to" a surface of a glass sheet, this does not require a separate adhesive, though an adhesive can optionally be used. It also does not require the hydrophobic silica aerogel sheet 300 to contact the glass; there may be a coating or layer therebetween. Thus, although "adhered to" may involve direct contact, the broader meaning as used herein is "carried alongside." This can optionally mean the hydrophobic silica aerogel sheet 300 is supported by the glass surface, and in some preferred embodiments the hydrophobic silica aerogel sheet 300 does contact the glass surface. In certain embodiments, there is at most one layer (e.g., an optical adhesive layer) between the hydrophobic silica aerogel sheet 300 and the glass sheet 12. In some cases, the hydrophobic silica aerogel sheet adheres to the glass sheet directly through van der Waals forces. In other cases, the hydrophobic silica aerogel sheet adheres to a glass sheet by an optical adhesive, optionally such that certain portions of the silica aerogel sheet are devoid of the optical adhesive. In embodiments of this nature, the optical adhesive can be located at a perimeter of the hydrophobic silica aerogel sheet.

A variety of known glass types can be used for the glass sheet 12, including soda-lime glass, borosilicate glass or aluminosilicate glass. In some cases, it may be desirable to use "white glass," a low iron glass, etc. For some applications, it may be desirable to use tinted glass for the glass sheet 12. Moreover, there may be applications where the glass sheet 12 is formed of extremely thin, flexible glass, such as glass sold under the trademark Willow glass by Corning Inc. (Corning, New York, U.S.A.). If desired, the glass sheet 12 may be formed of a chemically strengthened glass, such as glass sold under the trademark Gorilla glass by Corning Inc. In certain embodiments, the glass sheet is part of a window, door, skylight, or other glazing. In some cases, the glass sheet is part of a window insert or interior window designed to be retrofitted to an inside of an existing window. Exemplary window inserts are sold as Indow Inserts (Indow, Oregon, U.S.A.) or ComfortSEAL Interior Windows (Larson Manufacturing, South Dakota, U.S.A.). In alternative embodiments, the glass sheet 12 is replaced with a sheet formed of a polymer, such as polycarbonate, acrylic, or PVC. Various other polymer materials (e.g., transparent polymers) may be used in such alternative embodiments.

Glass sheets of many sizes can be used. Commonly, large-area glass sheets are used. For example, the glass sheet 12 can have a major dimension (e.g., a length or width) of at least about 0.1 meter, preferably at least about 0.5 meter, more preferably at least about 1 meter, or at least about 1.5 meters (e.g., between about 2 meters and about 4 meters), and in some cases at least about 3 meters. In some embodiments, the glass sheet 12 is a jumbo glass sheet having a length and/or width that is between about 3 meters and about 10 meters, e.g., a glass sheet 12 having a width of about 3.5 meters and a length of about 6.5 meters.

Glass sheets of various thicknesses can be used. In some embodiments, the glass sheet 12 can have a thickness of about 1-8 mm. In some cases, the glass sheet 12 has a thickness of between about 2.3 mm and about 4.8 mm, and more preferably between about 2.5 mm and about 4.8 mm. In one particular embodiment, the glass sheet 12 has a thickness of about 3 mm.

Figure 4:
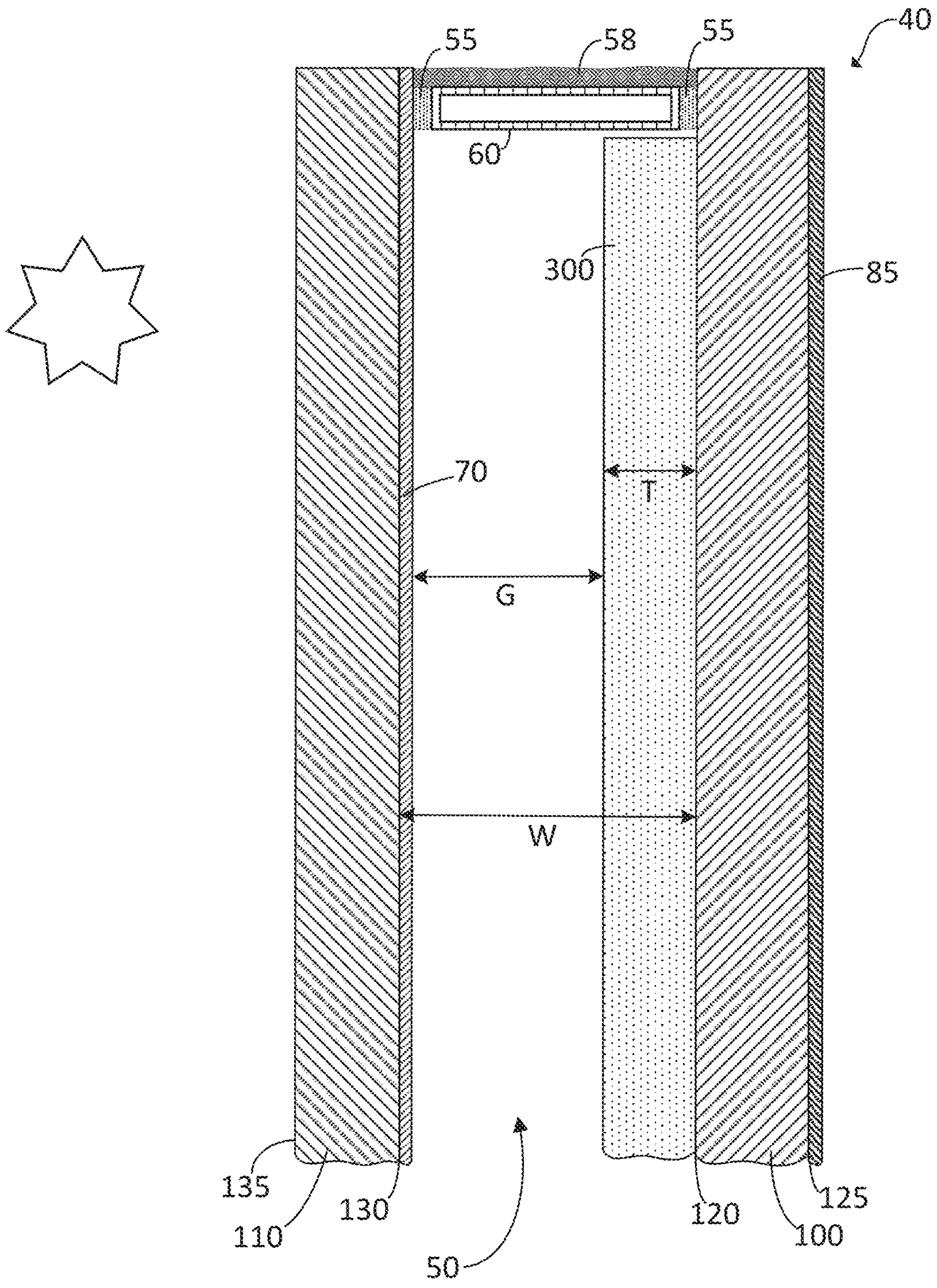
FIG. 4 is a schematic, partially broken-away, cross-sectional side view of an insulating glazing unit in accordance with certain embodiments.

Some embodiments provide an insulating glazing unit. FIG. 4 illustrates an insulating glazing unit 40 according to certain embodiments comprising a first glass sheet 100, a second glass sheet 110, and a between-pane space 50. The between-pane space 50 is located between the two glass sheets. The glass sheets 100, 110 can have any of the features described for a glass sheet elsewhere herein. In alternative embodiments, one or both glass sheets 100, 110 are replaced with sheets formed of a polymer, such as polycarbonate. Various other polymer materials may be used in such alternative embodiments. The insulating glazing unit further comprises a hydrophobic silica aerogel sheet 300 within the between-pane space 50. The hydrophobic silica aerogel sheet 300 can have any of the features and properties described elsewhere herein.

In some cases, the hydrophobic silica aerogel sheet 300 is a single aerogel sheet. In such cases, there is only one hydrophobic silica aerogel sheet 300 in the between-pane space 50. The single hydrophobic silica aerogel sheet 300 can, for example, have a major dimension (e.g., a length or width) of at least 0.375 meter, for example at least about 0.7 meter, 0.75 meter, 0.8 meter, 0.85 meter, 0.9 meter, 0.95 meter, 1.0 meter, or in some cases at least about 1.125 meters or 1.25 meters. In certain embodiments, the hydrophobic silica aerogel sheet 300 has a major dimension of between 0.7 meter and 3 meters.

In other cases, the hydrophobic silica aerogel sheet 300 comprises plurality of hydrophobic silica aerogel sheets. In such cases, there are a plurality of hydrophobic silica aerogel sheets in the between-pane space 50. A plurality of hydrophobic silica aerogel sheets may thus collectively define the hydrophobic silica aerogel sheet 300. When multiple aerogel sheets are used, they can be arranged in a tiled configuration between the two glass sheets 100, 110. When a tiled configuration is used, multiple aerogel sheets preferably are arranged in a non-overlapping manner so as to cover a majority (i.e., greater than 50%, preferably at least 75%) of the area of an adjacent interior glass surface 120, 130.

Whether the hydrophobic silica aerogel sheet 300 is formed by one or multiple aerogel sheets, it preferably covers more than 60% (e.g., more than 70%, more than 80%, or even more than 90%) of an adjacent interior glass surface 120, 130. A coverage within any one or more (e.g., all) of these ranges can optionally be used in any embodiment of the present disclosure.

When the hydrophobic silica aerogel sheet 300 comprises a plurality of aerogel sheets, those sheets can have any desired shape and tiling arrangement. As non-limiting examples, the aerogel sheets can be square, rectangular, or hexagonal in shape. In some embodiments, edges of each aerogel sheet are aligned both vertically and horizontally with edges of adjacent aerogel sheets. Reference is made to U.S. patent application Ser. No. 17/390,178, the teachings of which relating to aerogel sheet tiling arrangements are hereby incorporated by reference.

When multiple hydrophobic silica aerogel sheets are provided in a tiling arrangement, the size of the hydrophobic silica aerogel sheets is not particularly limited. In some cases, all of the hydrophobic silica aerogel sheets have the same dimensions. In other cases, some of the hydrophobic silica aerogel sheets have different dimensions (e.g., a greater length) compared to some of the other hydrophobic silica aerogel sheets. Preferably, each of the hydrophobic silica aerogel sheets has a length and a width of at least 10 cm. For each of the hydrophobic silica aerogel sheets, the length, the width, or both are preferably less than 1 meter. Such dimensions can provide one way for the hydrophobic silica aerogel sheets to be scaled-up so as to cover large areas between two glass sheets of an insulating glazing unit, while still allowing the hydrophobic silica aerogel sheets to be dried using a small high-pressure vessel. Larger or smaller hydrophobic silica aerogel sheets may alternatively be used. Moreover, in any embodiment of the present disclosure, a single aerogel sheet (rather than multiple aerogel sheets) can optionally be provided in a between-pane space.

In certain embodiments, the between-pane space 50 contains a gaseous atmosphere, preferably comprising a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is just air.

In certain cases, a gas gap G is provided in the between-pane space 50 alongside the hydrophobic silica aerogel sheet 300. In some cases, the gas gap G has a width in a range of from 9 to 14 mm and it contains a gaseous atmosphere comprising argon, air, or both. In certain cases, the between-pane space has a width W in a range of from 14 to 21 mm, the gaseous atmosphere comprises argon, and the width of the gas gap G is from 10.5 to 13.5 mm. Reference is made to U.S. patent application Ser. No. 17/389,603, the teachings of which relating to gas gap and between-pane space configurations are hereby incorporated by reference.

Certain embodiments include a spacer 60 between the two glass sheets 100, 110. The spacer 60 may be a conventional metal channel spacer, e.g., formed of stainless steel or aluminum. Or it can comprise polymer and metal, or just polymer (e.g., foam). The spacer can alternatively be an integral part of a sash, frame, etc. so as to maintain the IG unit in the desired configuration.

The spacer 60 can be adhered to the two glass sheets 100, 110 by one or more beads of sealant, as is conventional and well-known to skilled artisans. In FIG. 4, the spacer 60 is shown with a primary sealant 55 on opposite sides of the spacer 60 and a secondary sealant 58 provided on an outside wall of the spacer 60. Another option is to omit the secondary sealant and provide a single deposit of sealant along both sides of the spacer and on the outside wall of the spacer. Various other known sealant arrangements/systems can alternatively be used. In other cases, the spacer may be omitted while one or more beads of sealant (optionally together with a moisture vapor barrier) are provided about the perimeter of the unit so as to encompass the hydrophobic silica aerogel sheet 300.

In some embodiments, the hydrophobic silica aerogel sheet 300 does not contact the spacer 60. For example, the hydrophobic aerogel sheet 300 may be separated (i.e., spaced-apart) from the spacer 60 by about 1 mm to about 5 mm (e.g., about 2-4 mm, such as about 3 mm). When provided, the sealant 55, 58 between the spacer 60 and the two adjacent glass sheets 100, 110 can also be spaced from the hydrophobic silica aerogel sheet 300.

The first glass sheet 100 has opposed surfaces 120, 125, which preferably are opposed major surfaces (or "opposed faces"). Similarly, the second glass sheet 110 has opposed surfaces 130, 135, which preferably are opposed major surfaces. In some cases, surfaces 120 and 130 are interior surfaces facing a between-pane space 50, while surfaces 125 and 135 are exterior surfaces, e.g., such that surface 135 is an exterior surface exposed to an outdoor environment (and thus exposed to periodic contact with rain). This, however, is not required.

In some embodiments, the second glass sheet 110 is an outboard pane that defines both a #1 surface (i.e., surface 135) and a #2 surface (i.e., surface 130), while the first glass sheet 100 is an inboard pane that defines both a #3 surface (i.e., surface 120) and a #4 surface (i.e., surface 125). The IG unit 40 can optionally be mounted in a frame such that the #1 surface is exposed to an outdoor environment, while the #4 surface is exposed to an indoor environment (e.g., an environment inside a building).

The hydrophobic silica aerogel sheet 300 can be adhered to either the #2 surface or the #3 surface of the insulating glazing unit 40. Another option is to have hydrophobic silica aerogel sheets on both the #2 and the #3 surfaces. FIG. 4 illustrates one embodiment where the hydrophobic silica aerogel sheet 300 is adhered to an interior surface 120 (e.g., the #3 surface) of the first glass sheet 100.

While FIG. 4 shows a double-pane insulating glazing unit, other embodiments provide a triple-pane insulating glazing unit having a hydrophobic silica aerogel sheet 300 on the #2 surface, the #3 surface, the #4 surface, or the #5 surface. In triple-pane embodiments, hydrophobic silica aerogel sheets can optionally be provided on both the #3 surface and either the #4 or #5 surface. Another option is to provide hydrophobic silica aerogel sheets on both the #2 surface and the #4 or #5 surface. In one preferred group of embodiments, however, the insulating glazing unit 40 includes only two glass panes 100, 110 and only one between-pane space 50.

The hydrophobic silica aerogel sheet 300 has a thickness T. In some embodiments, the hydrophobic silica aerogel sheet 300 has a thickness in a range of from 1.5 mm to 15 mm, such as greater than 2 mm but less than 8 mm, or from 2 mm to 4 mm (e.g., 3 mm). It is to be appreciated, however, that other thicknesses can be used.

The between-pane space 50 has a thickness W, which is measured from the interior surface 130 of the second glass pane 110 to the interior surface 120 of the first glass pane 100. In certain embodiments, the hydrophobic silica aerogel sheet 300 does not occupy the entire thickness W of the between-pane space 50. In other cases, the hydrophobic silica aerogel sheet occupies the entire thickness of the between-pane space.

A ratio of the thickness T of the hydrophobic silica aerogel sheet 300 to the thickness W of the between-pane space 50 preferably is between 0.15 and 0.85. In some embodiments, the thickness W of the between-pane space 50 is at least 10 mm, optionally together with the thickness of the hydrophobic silica aerogel sheet 300 being greater than 2 mm but less than 8 mm. In certain preferred embodiments, the hydrophobic aerogel sheet 300 occupies less than 50% of the thickness W of the between-pane space 50 (e.g., less than 45%, less than 40%, or even less than 35% of the thickness W of the between-pane space 50).

In other embodiments, the hydrophobic silica aerogel sheet 300 occupies a majority of the thickness W of the between-pane space 50. In such instances, the thickness T of the hydrophobic silica aerogel sheet 300 preferably is greater than 8 mm but less than 15 mm (e.g., about 10 mm), while the thickness of the gas gap G alongside the hydrophobic silica aerogel sheet 300 is optionally less than 5 mm (e.g., about 3 mm).

Certain embodiments provide an insulating glazing unit 40 that includes both a hydrophobic silica aerogel sheet 300 and a low-emissivity coating 70. In some cases, the hydrophobic silica aerogel sheet 300 is provided on an interior surface of one glass sheet and the low-emissivity coating 70 is provided on an interior surface of the other glass sheet. FIG. 4 illustrates an embodiment that includes a hydrophobic silica aerogel sheet 300 on a #3 surface (i.e., surface 120) and an optional low-emissivity coating 70 on a #2 surface (i.e., surface 130). In another embodiment, a hydrophobic silica aerogel sheet is provided on a #2 surface (i.e., surface 130) and an optional low-emissivity or solar control coating is provided on a #3 surface (i.e., surface 120). In still another embodiment, both a hydrophobic silica aerogel sheet and a coating (e.g., a low-emissivity or solar control coating) are provided on a #2 surface, such as by having a low-emissivity coating on the #2 surface and the aerogel sheet on the low-emissivity coating.

When provided, the optional low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent and application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating can be a "single silver" or "double silver" low-emissivity coating, which are well-known to skilled artisans. Advantageous coatings of this nature are commercially available from, for example, Cardinal CG Company (Eden Prairie, Minnesota, U.S.A.).

Certain embodiments provide an insulating glazing unit 40 that includes both a hydrophobic silica aerogel sheet 300 and an optional transparent conductive oxide coating 85. In some cases, the hydrophobic silica aerogel sheet 300 is provided on an interior surface of a glass sheet and a transparent conductive oxide coating 85 is provided on an exterior surface of a glass sheet. In certain embodiments, a hydrophobic silica aerogel sheet 300 is provided on an interior surface and a transparent conductive oxide coating 85 is provided on an exterior surface of the same glass sheet. FIG. 4 illustrates an embodiment where the hydrophobic silica aerogel sheet 300 is provided on a #3 surface (i.e., surface 120) and an optional transparent conductive oxide coating 85 is provided on a #4 surface (i.e., surface 125). Another option is to provide the hydrophobic silica aerogel sheet on a #2 surface (i.e., surface 120) in combination with providing optional transparent conductive oxide coating 85 on a #1 surface, on a #4 surface, or both.

When provided, the optional transparent conductive oxide coating 85 can include indium tin oxide. In alternate embodiments, zinc aluminum oxide, SnO:Sb, SnO:F, or another known transparent conductive oxide is used. In some cases, transparent conductive oxide coating 85 comprises tin oxide together with antimony, fluorine, or another dopant. Further, in some cases, the transparent conductive oxide coating 85 is a sputtered film. In other embodiments, the transparent conductive oxide coating 85 comprises a pyrolytic film that includes tin (e.g., comprising tin oxide together with antimony, fluorine, or another dopant). Also, in some cases, the transparent conductive oxide coating 85 includes carbon nanotubes.

When provided, the transparent conductive oxide coating 85 preferably is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a transparent conductive oxide film having a thickness of from 1,000 Å to 1,750 Å.

The transparent conductive oxide coating 85 can, for example, be a coating of the type described in any of U.S. Pat. No. 9,862,640 or 10,000,965 or 10,000,411 or Ser. No. 16/740,006, the teachings of which concerning the transparent conductive oxide coating are hereby incorporated herein by reference. In the embodiment of FIG. 4, the illustrated transparent conductive oxide coating 85 can optionally be omitted.

In some cases, the insulating glazing unit 40 includes both a transparent conductive oxide coating 85 and a low-emissivity coating 70. This, however, is by no means required. For example, in some cases, the insulating glazing unit 40 includes the low-emissivity coating 70 but is devoid of the transparent conductive oxide coating 85.

Other embodiments provide a method of making an insulating glazing unit. The method comprises forming a hydrophobic silica aerogel sheet according to any method described herein and assembling the hydrophobic silica aerogel sheet together with the first and second glass sheets 100, 110 in forming the insulating glazing unit. The hydrophobic silica aerogel sheet can be adhered to a surface of a glass sheet (e.g., through van der Waals forces, or by using an optical adhesive). The hydrophobic silica aerogel sheet may be placed either manually or, more preferably, with robotics. In some embodiments, the hydrophobic silica aerogel sheet is adhered to a temporary surface for handling and placement. The hydrophobic silica aerogel sheet can be picked up using electrostatic adhesion, e.g., using commercially available Stackit robots manufactured by Grabit, Inc. (Sunnyvale, California, U.S.A.) or using technology described in U.S. patent application Ser. No. 18/536,611, the contents of which are incorporated herein by reference.

Figure 5:
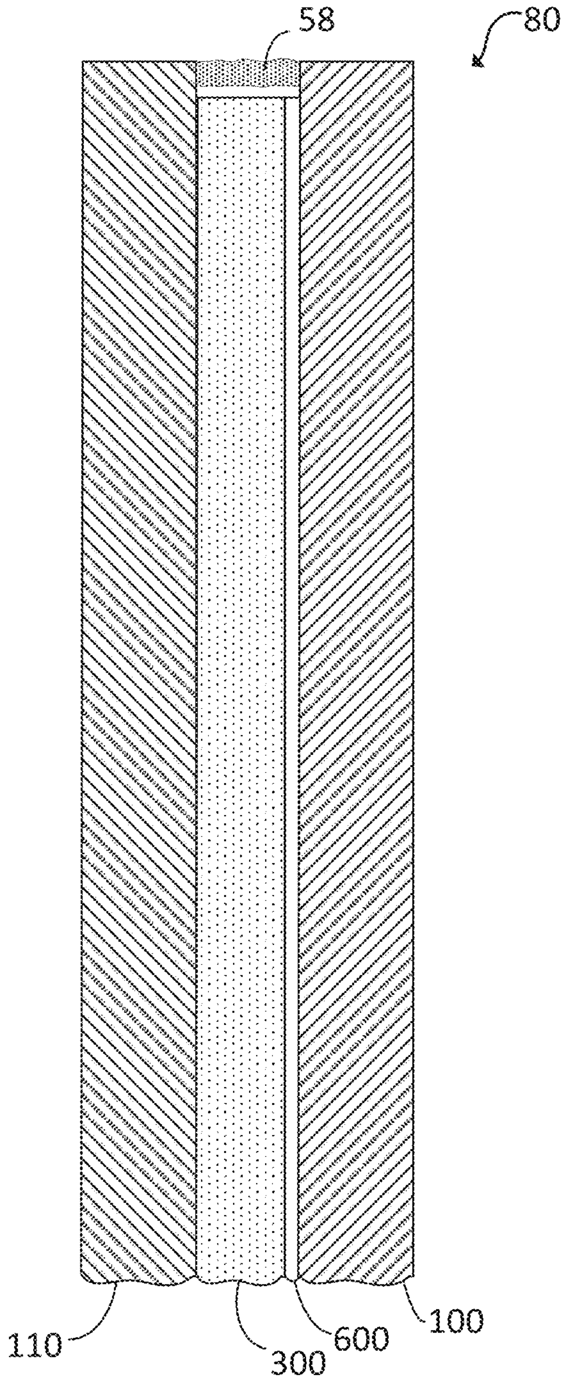
FIG. 5 is a schematic, partially broken-away, cross-sectional side view of a laminated glass assembly that includes a hydrophobic silica aerogel sheet in accordance with certain embodiments.

Certain embodiments provide a laminated glass assembly. FIG. 5 illustrates a laminated glass assembly 80 comprising a first glass sheet 100, a second glass sheet 110 and a hydrophobic silica aerogel sheet 300. In some embodiments, the laminated glass assembly 80 also includes a spacer. In other cases, the spacer is omitted and the laminated glass assembly 80 just has one or more beads of sealant 58 (optionally together with a foil moisture barrier, tape, or both) at the perimeter of the assembly.

The hydrophobic silica aerogel sheet 300 can have any of the features and properties discussed elsewhere herein. Likewise, the hydrophobic silica aerogel sheet 300 of the laminated glass assembly 80 can have the same dimensions and material properties as the hydrophobic silica aerogel sheet 300 described elsewhere herein for the insulating glazing unit 40.

The laminated glass assembly 80 can also include a polymer interlayer 400. The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can also be used. In certain embodiments, both glass sheets 100, 110 can be clear 3 mm soda-lime float glass and the polymer interlayer 400 can be 0.30-inch thick PVB. It is to be appreciated, however, that these details are by no means limiting.

FIG. 5 shows an embodiment having a single polymer interlayer 400. In such embodiments, the hydrophobic silica aerogel sheet 300 can be adhered to one of the two glass sheets 100, 110 (e.g., through van der Waals forces, or by using an optical adhesive). In other embodiments, there are two polymer interlayers. In such embodiments, the hydrophobic silica aerogel sheet is sandwiched between, and laminated to, the two polymer interlayers. In such cases, the polymer interlayers are each in contact with one of the glass sheets on opposite sides of the hydrophobic silica aerogel sheet. In still other embodiments, the polymer interlayer(s) are omitted, and the hydrophobic silica aerogel sheet replaces the interlayer(s).

Other embodiments provide a method of making a laminated glass assembly. Here too, the method comprises forming a hydrophobic silica aerogel sheet according to any method described herein and assembling the hydrophobic silica aerogel sheet together with the first and second glass sheets 100, 110 in forming the laminated glass assembly. The hydrophobic silica aerogel sheet, the glass sheets, and one or more polymer interlayers can be assembled together as part of a laminated glass assembly using any suitable techniques. The lamination process may include various known autoclave glass lamination techniques. In some other cases, the process may include one or more steps described in U.S. Pat. Nos. 7,117,914 and 7,143,800, the teachings of which concerning non-autoclave glass lamination are incorporated herein by reference.

While some preferred embodiments of the invention have been described, it should be understood that various changes, adaptations and modifications may be made therein without departing from the spirit of the invention and the scope of the appended claims.

EMBODIMENTS

1. A method of making a hydrophobic silica wet gel having a density of between 100 mg/cc and 200 mg/cc, comprising the steps of:
   - preparing a first solution by mixing tetramethyl orthosilicate and solvent;
   - preparing a second solution by mixing solvent, ammonium hydroxide and water;
   - mixing the first solution and the second solution together to form a mixed solution;
   - allowing components in the mixed solution to react to form silica wet gel;
   - preparing a third solution by mixing ammonium hydroxide and solvent;
   - preparing a fourth solution by mixing methyltrimethoxysilane and diluent;
   - preparing a solvent exchange solution by mixing the third solution, the fourth solution and solvent; and
   - subjecting the silica wet gel to the solvent exchange solution to form a hydrophobic silica wet gel;
   - wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the first, second, third and fourth solutions.
2. The method of embodiment 1 wherein:
   - the total weight percent of the tetramethyl orthosilicate is greater than or equal to 2.3% and less than or equal to 5.5%;
   - the total weight percent of the methyltrimethoxysilane is greater than or equal to 0.5% and less than or equal to 0.8%;
   - the methanol has a total weight percent of greater than or equal to 91.8% and less than or equal to 95.2%;
   - the water has a total weight percent of greater than or equal to 1.9% and less than or equal to 2%; and
   - the ammonium hydroxide has a total weight percent of greater than or equal to 0.013% and less than or equal to 0.015%.
3. The method of embodiment 1 wherein the first solution comprises tetramethyl orthosilicate at a weight percent of greater than or equal to 23.5% and less than or equal to 52% and methanol at a weight percent of greater than or equal to 48% and less than or equal to 76.5%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 26.8% and methanol at a weight percent of greater than or equal to 73.2% and less than or equal to 80.5%.

4. The method of embodiment 1 wherein the hydrophobic silica wet gel has a density of between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.
5. The method of embodiment 4 wherein:
   the total weight percent of the tetramethyl orthosilicate is greater than or equal to 2.8% and less than or equal to 5.5%;
   the total weight percent of the methyltrimethoxysilane is greater than or equal to 0.5% and less than or equal to 0.8%;
   the methanol has a total weight percent of greater than or equal to 91.8% and less than or equal to 94.7%;
   the water has a total weight percent of greater than or equal to 1.9% and less than or equal to 2%; and
   the ammonium hydroxide has a total weight percent of greater than or equal to 0.013% and less than or equal to 0.015%.
6. The method of embodiment 4 wherein the first solution comprises tetramethyl orthosilicate at a weight percent of greater than or equal to 28.4% and less than or equal to 52% and methanol at a weight percent of greater than or equal to 48% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 26.8% and methanol at a weight percent of greater than or equal to 73.2% and less than or equal to 80.5%.
7. The method of embodiment 1 wherein the hydrophobic silica wet gel has a density of between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.

8 The method of embodiment 7 wherein:
   the total weight percent of the tetramethyl orthosilicate is greater than or equal to 2.8% and less than or equal to 4.3%;
   the total weight percent of the methyltrimethoxysilane is greater than or equal to 0.5% and less than or equal to 0.7%;
   the methanol has a total weight percent of greater than or equal to 93.1% and less than or equal to 94.7%;
   the water has a total weight percent of greater than or equal to 1.9% and less than or equal to 2%; and
   the ammonium hydroxide has a total weight percent of greater than or equal to 0.013% and less than or equal to 0.015%.

9. The method of embodiment 7 wherein the first solution comprises tetramethyl orthosilicate at a weight percent of greater than or equal to 28.4% and less than or equal to 41.3% and methanol at a weight percent of greater than or equal to 58.7% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 23.3% and methanol at a weight percent of greater than or equal to 76.7% and less than or equal to 80.5%.
10. The method of any preceding embodiment further comprising a step of aging the hydrophobic silica wet gel for a time period of at least 7 days (168 hours), at least 8 days (192 hours), at least 9 days (216 hours) or at least 10 days (240 hours).
11. A hydrophobic silica aerogel having a density of between 100 mg/cc and 200 mg/cc and being synthesized from a precursor material and a hydrophobic agent, wherein the precursor material comprises tetramethyl orthosilicate, methanol, water and ammonium hydroxide, and the hydrophobic agent comprises methyltrimethoxysilane and methanol, wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the precursor material and the hydrophobic agent.
12. The hydrophobic silica aerogel of embodiment 11 wherein:
   the total weight percent of the tetramethyl orthosilicate is greater than or equal to 2.3% and less than or equal to 5.5%;
   the total weight percent of the methyltrimethoxysilane is greater than or equal to 0.5% and less than or equal to 0.8%;
   the methanol has a total weight percent of greater than or equal to 91.8% and less than or equal to 95.2%;
   the water has a total weight percent of greater than or equal to 1.9% and less than or equal to 2%; and
   the ammonium hydroxide has a total weight percent of greater than or equal to 0.013% and less than or equal to 0.015%.
13. The hydrophobic silica aerogel of embodiment 11 wherein the density of the hydrophobic silica aerogel is between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.
14. The hydrophobic silica aerogel of embodiment 13 wherein:
   the total weight percent of the tetramethyl orthosilicate is greater than or equal to 2.8% and less than or equal to 5.5%;
   the total weight percent of the methyltrimethoxysilane is greater than or equal to 0.5% and less than or equal to 0.8%;
   the methanol has a total weight percent of greater than or equal to 91.8% and less than or equal to 94.7%;

the water has a total weight percent of greater than or equal to 1.9% and less than or equal to 2%; and the ammonium hydroxide has a total weight percent of greater than or equal to 0.013% and less than or equal to 0.015%.

15. The hydrophobic silica aerogel of embodiment 11 wherein the density of the hydrophobic silica aerogel is between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.

16. The hydrophobic silica aerogel of embodiment 15 wherein:

the total weight percent of the tetramethyl orthosilicate is greater than or equal to 2.8% and less than or equal to 4.3%;

the total weight percent of the methyltrimethoxysilane is greater than or equal to 0.5% and less than or equal to 0.7%;

the methanol has a total weight percent of greater than or equal to 93.1% and less than or equal to 94.7%;

the water has a total weight percent of greater than or equal to 1.9% and less than or equal to 2%; and the ammonium hydroxide has a total weight percent of greater than or equal to 0.013% and less than or equal to 0.015%.

17. The hydrophobic silica aerogel of any preceding embodiment wherein the hydrophobic silica aerogel is in the form of a hydrophobic silica aerogel sheet.

18. The hydrophobic silica aerogel of any preceding embodiment wherein the hydrophobic silica aerogel sheet has a thickness of between 2 mm and 5 mm.

19. The hydrophobic silica aerogel of any preceding embodiment wherein the hydrophobic silica aerogel has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.

20. The hydrophobic silica aerogel of any preceding embodiment wherein the hydrophobic silica aerogel has a water contact angle of at least 90°, for example at least 100° or at least 110°.

21. A method of making a hydrophobic silica aerogel, comprising the steps of:

preparing a first solution by mixing tetramethyl orthosilicate and solvent;

preparing a second solution by mixing solvent, ammonium hydroxide and water;

mixing the first solution and the second solution together to form a mixed solution; allowing components in the mixed solution to react to form silica wet gel;

preparing a third solution by mixing ammonium hydroxide and solvent;

preparing a fourth solution by mixing methyltrimethoxysilane and diluent;

preparing a solvent exchange solution by mixing the third solution, the fourth solution and solvent;

subjecting the silica wet gel to the solvent exchange solution to form a hydrophobic silica wet gel; and drying the hydrophobic silica wet gel to form hydrophobic silica aerogel;

wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the first, second, third and fourth solutions.

22. The method of embodiment 21 wherein:

the total weight percent of the tetramethyl orthosilicate is greater than or equal to 2.3% and less than or equal to 5.5%;

the total weight percent of the methyltrimethoxysilane is greater than or equal to 0.5% and less than or equal to 0.8%;

the methanol has a total weight percent of greater than or equal to 91.8% and less than or equal to 95.2%;

the water has a total weight percent of greater than or equal to 1.9% and less than or equal to 2%; and the ammonium hydroxide has a total weight percent of greater than or equal to 0.013% and less than or equal to 0.015%.

23. The method of embodiment 21 wherein the first solution comprises tetramethyl orthosilicate at a weight percent of greater than or equal to 23.5% and less than or equal to 52% and methanol at a weight percent of greater than or equal to 48% and less than or equal to 76.5%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 26.8% and methanol at a weight percent of greater than or equal to 73.2% and less than or equal to 80.5%.

24. The method of embodiment 21 wherein the hydrophobic silica aerogel has a density of between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.

25. The method of embodiment 24 wherein:

the total weight percent of the tetramethyl orthosilicate is greater than or equal to 2.8% and less than or equal to 5.5%;

the total weight percent of the methyltrimethoxysilane is greater than or equal to 0.5% and less than or equal to 0.8%;

the methanol has a total weight percent of greater than or equal to 91.8% and less than or equal to 94.7%;

the water has a total weight percent of greater than or equal to 1.9% and less than or equal to 2%; and the ammonium hydroxide has a total weight percent of greater than or equal to 0.013% and less than or equal to 0.015%.

26. The method of embodiment 24 wherein the first solution comprises tetramethyl orthosilicate at a weight percent of greater than or equal to 28.4% and less than or equal to 52% and methanol at a weight percent of greater than or equal to 48% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 26.8% and methanol at a weight percent of greater than or equal to 73.2% and less than or equal to 80.5%.

27. The method of embodiment 21 wherein the hydrophobic silica aerogel has a density of between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.

28. The method of embodiment 27 wherein:
   - the total weight percent of the tetramethyl orthosilicate is greater than or equal to 2.8% and less than or equal to 4.3%;
   - the total weight percent of the methyltrimethoxysilane is greater than or equal to 0.5% and less than or equal to 0.7%;
   - the methanol has a total weight percent of greater than or equal to 93.1% and less than or equal to 94.7%;
   - the water has a total weight percent of greater than or equal to 1.9% and less than or equal to 2%; and
   - the ammonium hydroxide has a total weight percent of greater than or equal to 0.013% and less than or equal to 0.015%.

29. The method of embodiment 27 wherein the first solution comprises tetramethyl orthosilicate at a weight percent of greater than or equal to 28.4% and less than or equal to 41.3% and methanol at a weight percent of greater than or equal to 58.7% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3% and the fourth solution comprises methyltrimethoxysilane at a weight percent of greater than or equal to 19.5% and less than or equal to 23.3% and methanol at a weight percent of greater than or equal to 76.7% and less than or equal to 80.5%.

30. The method of any preceding embodiment further comprising a step of aging the hydrophobic silica wet gel for a time period of at least 7 days (168 hours), at least 8 days (192 hours), at least 9 days (216 hours) or at least 10 days (240 hours).

31. The method of any preceding embodiment comprising a step of subjecting the hydrophobic silica wet gel to solvent extraction with methanol for an extraction time period of less than 24 hours.

32. The method of any preceding embodiment wherein the step of drying the hydrophobic silica wet gel to form hydrophobic silica aerogel comprises subjecting the hydrophobic silica wet gel to drying to form the hydrophobic silica aerogel with a shrinkage value of 4% or less, for example 3.5% or less, 3% or less, 2.5% or less, 2% or less or 1.75% or less.

33. The method of any preceding embodiment wherein the step of drying the hydrophobic silica wet gel to form hydrophobic silica aerogel comprises subjecting the hydrophobic silica wet gel to drying to form the hydrophobic silica aerogel with a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.

34. The method of any preceding embodiment wherein the method is devoid of using a surfactant.

35. An article comprising a glass substrate and a hydrophobic silica aerogel sheet, the hydrophobic silica aerogel sheet being adhered to the glass substrate, the hydrophobic silica aerogel sheet having a density of between 100 mg/cc and 200 mg/cc and being synthesized from a precursor material and a hydrophobic agent, wherein the precursor material comprises tetramethyl orthosilicate, methanol, water and ammonium hydroxide and the hydrophobic agent comprises methyltrimethoxysilane and methanol, wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the precursor material and the hydrophobic agent.

36. The article of embodiment 35 wherein:
   - the total weight percent of the tetramethyl orthosilicate is greater than or equal to 2.3% and less than or equal to 5.5%;
   - the total weight percent of the methyltrimethoxysilane is greater than or equal to 0.5% and less than or equal to 0.8%;
   - the methanol has a total weight percent of greater than or equal to 91.8% and less than or equal to 95.2%;
   - the water has a total weight percent of greater than or equal to 1.9% and less than or equal to 2%; and
   - the ammonium hydroxide has a total weight percent of greater than or equal to 0.013% and less than or equal to 0.015%.

37. The article of embodiment 35 wherein the density of the hydrophobic silica aerogel sheet is between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.

38. The article of embodiment 37 wherein:
   - the total weight percent of the tetramethyl orthosilicate is greater than or equal to 2.8% and less than or equal to 5.5%;
   - the total weight percent of the methyltrimethoxysilane is greater than or equal to 0.5% and less than or equal to 0.8%;
   - the methanol has a total weight percent of greater than or equal to 91.8% and less than or equal to 94.7%;
   - the water has a total weight percent of greater than or equal to 1.9% and less than or equal to 2%; and the ammonium hydroxide has a total weight percent of greater than or equal to 0.013% and less than or equal to 0.015%.

39. The article of embodiment 35 wherein the density of the hydrophobic silica aerogel sheet is between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.

40. The article of embodiment 39 wherein:
the total weight percent of the tetramethyl orthosilicate is greater than or equal to 2.8% and less than or equal to 4.3%;
the total weight percent of the methyltrimethoxysilane is greater than or equal to 0.5% and less than or equal to 0.7%;
the methanol has a total weight percent of greater than or equal to 93.1% and less than or equal to 94.7%;
the water has a total weight percent of greater than or equal to 1.9% and less than or equal to 2%; and
the ammonium hydroxide has a total weight percent of greater than or equal to 0.013% and less than or equal to 0.015%.

41. The article of any preceding embodiment wherein the hydrophobic silica aerogel sheet has a thickness of between 2 mm and 5 mm.

42. The article of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.

43. The article of any preceding embodiment wherein the hydrophobic silica aerogel sheet has a water contact angle of at least 90°, for example at least 100° or at least 110°.

44. An insulating glazing unit comprising two glass sheets and a between-pane space, the between-pane space being located between the two glass sheets, the insulating glazing unit further comprising a hydrophobic silica aerogel sheet received in the between-pane space, the hydrophobic silica aerogel sheet having a density of between 100 mg/cc and 200 mg/cc and being synthesized from a precursor material and a hydrophobic agent, wherein the precursor material comprises tetramethyl orthosilicate, methanol, water and ammonium hydroxide and the hydrophobic agent comprises methyltrimethoxysilane and methanol, wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the precursor material and the hydrophobic agent.

45. The insulating glazing unit of embodiment 44 wherein:
the total weight percent of the tetramethyl orthosilicate is greater than or equal to 2.3% and less than or equal to 5.5%;
the total weight percent of the methyltrimethoxysilane is greater than or equal to 0.5% and less than or equal to 0.8%;
the methanol has a total weight percent of greater than or equal to 91.8% and less than or equal to 95.2%;
the water has a total weight percent of greater than or equal to 1.9% and less than or equal to 2%; and
the ammonium hydroxide has a total weight percent of greater than or equal to 0.013% and less than or equal to 0.015%.

46. The insulating glazing unit of embodiment 44 wherein the density of the hydrophobic silica aerogel sheet is between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.

47. The insulating glazing unit of embodiment 46 wherein:
the total weight percent of the tetramethyl orthosilicate is greater than or equal to 2.8% and less than or equal to 5.5%;
the total weight percent of the methyltrimethoxysilane is greater than or equal to 0.5% and less than or equal to 0.8%;
the methanol has a total weight percent of greater than or equal to 91.8% and less than or equal to 94.7%;
the water has a total weight percent of greater than or equal to 1.9% and less than or equal to 2%; and
the ammonium hydroxide has a total weight percent of greater than or equal to 0.013% and less than or equal to 0.015%.

48. The insulating glazing unit of embodiment 44 wherein the density of the hydrophobic silica aerogel sheet is between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.

49. The insulating glazing unit of embodiment 48 wherein:
the total weight percent of the tetramethyl orthosilicate is greater than or equal to 2.8% and less than or equal to 4.3%;
the total weight percent of the methyltrimethoxysilane is greater than or equal to 0.5% and less than or equal to 0.7%;
the methanol has a total weight percent of greater than or equal to 93.1% and less than or equal to 94.7%;
the water has a total weight percent of greater than or equal to 1.9% and less than or equal to 2%; and
the ammonium hydroxide has a total weight percent of greater than or equal to 0.013% and less than or equal to 0.015%.

50. The insulating glazing unit of any preceding embodiment wherein the hydrophobic silica aerogel sheet has a thickness of between 2 mm and 5 mm.

51. The insulating glazing unit of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.

52. The insulating glazing unit of any preceding embodiment wherein the hydrophobic silica aerogel sheet has a water contact angle of at least 90°, for example at least 100° or at least 110°.
53. A laminated glass assembly comprising two glass sheets and a hydrophobic silica aerogel sheet between the two glass sheets, the hydrophobic silica aerogel sheet having a density of between 100 mg/cc and 200 mg/cc and being synthesized from a precursor material and a hydrophobic agent, wherein the precursor material comprises tetramethyl orthosilicate, methanol, water and ammonium hydroxide and the hydrophobic agent comprises methyltrimethoxysilane and methanol, wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the precursor material and the hydrophobic agent.
54. The laminated glass assembly of embodiment 53 wherein:
    - the total weight percent of the tetramethyl orthosilicate is greater than or equal to 2.3% and less than or equal to 5.5%;
    - the total weight percent of the methyltrimethoxysilane is greater than or equal to 0.5% and less than or equal to 0.8%;
    - the methanol has a total weight percent of greater than or equal to 91.8% and less than or equal to 95.2%;
    - the water has a total weight percent of greater than or equal to 1.9% and less than or equal to 2%; and
    - the ammonium hydroxide has a total weight percent of greater than or equal to 0.013% and less than or equal to 0.015%.
55. The laminated glass assembly of embodiment 53 wherein the density of the hydrophobic silica aerogel sheet is between 120 mg/cc and 200 mg/cc and the total weight percent of the tetramethyl orthosilicate is greater than or equal to 2.8% and less than or equal to 5.5% and the total weight percent of the methyltrimethoxysilane is greater than or equal to 0.5% and less than or equal to 0.8%.
56. The laminated glass assembly of embodiment 55 wherein:
    - the total weight percent of the tetramethyl orthosilicate is greater than or equal to 2.8% and less than or equal to 5.5%;
    - the total weight percent of the methyltrimethoxysilane is greater than or equal to 0.5% and less than or equal to 0.8%;
    - the methanol has a total weight percent of greater than or equal to 91.8% and less than or equal to 94.7%;
    - the water has a total weight percent of greater than or equal to 1.9% and less than or equal to 2%; and
    - the ammonium hydroxide has a total weight percent of greater than or equal to 0.013% and less than or equal to 0.015%.
57. The laminated glass assembly of embodiment 53 wherein the density of the hydrophobic silica aerogel sheet is between 120 mg/cc and 150 mg/cc and the total weight percent of the tetramethyl orthosilicate is greater than or equal to 2.8% and less than or equal to 4.3% and the total weight percent of the methyltrimethoxysilane is greater than or equal to 0.5% and less than or equal to 0.7%.
58. The laminated glass assembly of embodiment 57 wherein:
    - the total weight percent of the tetramethyl orthosilicate is greater than or equal to 2.8% and less than or equal to 4.3%;
    - the total weight percent of the methyltrimethoxysilane is greater than or equal to 0.5% and less than or equal to 0.7%;
    - the methanol has a total weight percent of greater than or equal to 93.1% and less than or equal to 94.7%;
    - the water has a total weight percent of greater than or equal to 1.9% and less than or equal to 2%; and
    - the ammonium hydroxide has a total weight percent of greater than or equal to 0.013% and less than or equal to 0.015%.
59. The laminated glass assembly of any preceding embodiment wherein the hydrophobic silica aerogel sheet has a thickness of between 2 mm and 5 mm.
60. The laminated glass assembly of any preceding embodiment wherein the hydrophobic silica aerogel sheet has a visible transmission of at least 97.8% and a haze value of 3% or less, for example a visible transmission of at least 98% and a haze value of 3% or less, a visible transmission of at least 98.6% and a haze value of 2.5% or less, or a visible transmission of at least 99% and a haze value of 2% or less.
61. The laminated glass assembly of any preceding embodiment wherein the hydrophobic silica aerogel sheet has a water contact angle of at least 90°, for example at least 100° or at least 110°.

What is claimed is:

1. A method of making a hydrophobic silica aerogel, comprising the steps of:
- preparing a first solution by mixing tetramethyl orthosilicate and a first solvent;
- preparing a second solution by mixing a second solvent, ammonium hydroxide and water;
- mixing the first solution and the second solution together to form a mixed solution;
- allowing components in the mixed solution to react to form silica wet gel;
- preparing a third solution by mixing ammonium hydroxide and a third solvent;
- preparing a fourth solution by mixing methyltrimethoxysilane and diluent;
- preparing a solvent exchange solution by mixing the third solution, the fourth solution and an additional solvent;
- subjecting the silica wet gel to the solvent exchange solution to form a hydrophobic silica wet gel; and
- drying the hydrophobic silica wet gel to form hydrophobic silica aerogel;
- wherein the tetramethyl orthosilicate has a total weight percent of greater than or equal to 2.3% and less than or equal to 5.5% and the methyltrimethoxysilane has a total weight percent of greater than or equal to 0.5% and less than or equal to 0.8%, wherein total weight percent represents a total weight percent of a component in the first, second, third and fourth solutions.

2. The method of claim 1 wherein:
- the total weight percent of the tetramethyl orthosilicate is greater than or equal to 2.3% and less than or equal to 5.5%;
- the total weight percent of the methyltrimethoxysilane is greater than or equal to 0.5% and less than or equal to 0.8%;
- the first solvent, the second solvent, the third solvent and the diluent comprise methanol and the methanol has a total weight percent of greater than or equal to 91.8% and less than or equal to 95.2%;

the water has a total weight percent of greater than or equal to 1.9% and less than or equal to 2%; and the ammonium hydroxide has a total weight percent of greater than or equal to 0.013% and less than or equal to 0.015%.

3. The method of claim 1 wherein the first solution comprises tetramethyl orthosilicate at a weight percent of greater than or equal to 23.5% and less than or equal to 52% and methanol at a weight percent of greater than or equal to 48% and less than or equal to 76.5%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3%, and the fourth solution comprises methyltrimethoxysilane at a weight percent of greater than or equal to 19.5% and less than or equal to 26.8% and methanol at a weight percent of greater than or equal to 73.2% and less than or equal to 80.5%.

4. The method of claim 1 wherein the hydrophobic silica aerogel has a density of between 120 mg/cc and 200 mg/cc, the total weight percent of the tetramethyl orthosilicate is greater than or equal to 2.8% and less than or equal to 5.5%, and the total weight percent of the methyltrimethoxysilane is greater than or equal to 0.5% and less than or equal to 0.8%.

5. The method of claim 4 wherein:

the total weight percent of the tetramethyl orthosilicate is greater than or equal to 2.8% and less than or equal to 5.5%;

the total weight percent of the methyltrimethoxysilane is greater than or equal to 0.5% and less than or equal to 0.8%;

the first solvent, the second solvent, the third solvent and the diluent comprise methanol and the methanol has a total weight percent of greater than or equal to 91.8% and less than or equal to 94.7%;

the water has a total weight percent of greater than or equal to 1.9% and less than or equal to 2%; and the ammonium hydroxide has a total weight percent of greater than or equal to 0.013% and less than or equal to 0.015%.

6. The method of claim 4 wherein the first solution comprises tetramethyl orthosilicate at a weight percent of greater than or equal to 28.4% and less than or equal to 52% and methanol at a weight percent of greater than or equal to 48% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3%, and the fourth solution comprises methyltrimethoxysilane at a weight percent of greater than or equal to 19.5% and less than or equal to 26.8% and methanol at a weight percent of greater than or equal to 73.2% and less than or equal to 80.5%.

7. The method of claim 1 wherein the hydrophobic silica aerogel has a density of between 120 mg/cc and 150 mg/cc, the total weight percent of the tetramethyl orthosilicate is greater than or equal to 2.8% and less than or equal to 4.3%, and the total weight percent of the methyltrimethoxysilane is greater than or equal to 0.5% and less than or equal to 0.7%.

8. The method of claim 7 wherein:

the total weight percent of the tetramethyl orthosilicate is greater than or equal to 2.8% and less than or equal to 4.3%;

the total weight percent of the methyltrimethoxysilane is greater than or equal to 0.5% and less than or equal to 0.7%;

the first solvent, the second solvent, the third solvent and the diluent comprise methanol and the methanol has a total weight percent of greater than or equal to 93.1% and less than or equal to 94.7%;

the water has a total weight percent of greater than or equal to 1.9% and less than or equal to 2%; and the ammonium hydroxide has a total weight percent of greater than or equal to 0.013% and less than or equal to 0.015%.

9. The method of claim 7 wherein the first solution comprises tetramethyl orthosilicate at a weight percent of greater than or equal to 28.4% and less than or equal to 41.3% and methanol at a weight percent of greater than or equal to 58.7% and less than or equal to 71.6%, the second solution comprises water at a weight percent of greater than or equal to 99.6% and less than or equal to 99.7% and ammonium hydroxide at a weight percent of greater than or equal to 0.3% and less than or equal to 0.4%, the third solution comprises ammonium hydroxide at a weight percent of greater than or equal to 3.7% and less than or equal to 3.8% and methanol at a weight percent of greater than or equal to 96.2% and less than or equal to 96.3%, and the fourth solution comprises methyltrimethoxysilane at a weight percent of greater than or equal to 19.5% and less than or equal to 23.3% and methanol at a weight percent of greater than or equal to 76.7% and less than or equal to 80.5%.

10. The method of claim 1 further comprising a step of aging the hydrophobic silica wet gel for a time period of at least 7 days (168 hours).

11. The method of claim 1 comprising a step of subjecting the hydrophobic silica wet gel to solvent extraction with methanol for an extraction time period of less than 24 hours.

12. The method of claim 1 wherein the step of drying the hydrophobic silica wet gel to form hydrophobic silica aerogel comprises subjecting the hydrophobic silica wet gel to drying to form the hydrophobic silica aerogel with a shrinkage value of 4% or less.

13. The method of claim 1 wherein the step of drying the hydrophobic silica wet gel to form hydrophobic silica aerogel comprises subjecting the hydrophobic silica wet gel to drying to form the hydrophobic silica aerogel with a visible transmission of at least 97.8% and a haze value of 3% or less.

14. The method of claim 1 wherein the method is devoid of using a surfactant.

15. The method of claim 10 wherein the time period for aging the hydrophobic silica wet gel is at least 10 days.

16. The method of claim 12 wherein the hydrophobic silica aerogel formed by drying the hydrophobic silica wet gel has a shrinkage value of 3% or less.

17. The method of claim 16 wherein the hydrophobic silica aerogel formed by drying the hydrophobic silica wet gel has a shrinkage value of 2% or less.

18. The method of claim 17 wherein the hydrophobic silica aerogel formed by drying the hydrophobic silica wet gel has a shrinkage value of 1.75% or less.

19. The method of claim 12 wherein the hydrophobic silica aerogel formed by drying the hydrophobic silica wet gel has a visible transmission of at least 98% and a haze value of 3% or less.

20. The method of claim 19 wherein the hydrophobic silica aerogel formed by drying the hydrophobic silica wet gel has a visible transmission of at least 98.6% and a haze value of 2.5% or less.

21. The method of claim 20 wherein the hydrophobic silica aerogel formed by drying the hydrophobic silica wet gel has a visible transmission of at least 99% and a haze value of 2% or less.

22. The method of claim 1 wherein the step of drying the hydrophobic silica wet gel to form hydrophobic silica aerogel comprises subjecting the hydrophobic silica wet gel to drying to form the hydrophobic silica aerogel with a water contact angle of at least 90°.

23. The method of claim 22 wherein the hydrophobic silica aerogel formed by drying the hydrophobic silica wet gel has a water contact angle of at least 100°.

24. The method of claim 23 wherein the hydrophobic silica aerogel formed by drying the hydrophobic silica wet gel has a water contact angle of at least 110°.

25. The method of claim 1 wherein the additional solvent comprises methanol.

* * * * *